(12) United States Patent
Kim et al.

(10) Patent No.: US 12,456,206 B2
(45) Date of Patent: Oct. 28, 2025

(54) ELECTRONIC DEVICE, METHOD, AND COMPUTER READABLE STORAGE MEDIUM FOR OBTAINING LOCATION INFORMATION OF AT LEAST ONE SUBJECT BY USING PLURALITY OF CAMERAS

(71) Applicant: THINKWARE CORPORATION, Seongnam-si (KR)

(72) Inventors: Shinhyoung Kim, Seongnam-si (KR); Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 377 days.

(21) Appl. No.: 18/089,704

(22) Filed: Dec. 28, 2022

(65) Prior Publication Data

US 2023/0206470 A1 Jun. 29, 2023

(30) Foreign Application Priority Data

Dec. 29, 2021 (KR) .................. 10-2021-0191025
Oct. 28, 2022 (KR) .................. 10-2022-0141865

(51) Int. Cl.
*G06T 7/246* (2017.01)
*G06V 20/56* (2022.01)
*G06V 20/58* (2022.01)

(52) U.S. Cl.
CPC ............. *G06T 7/248* (2017.01); *G06V 20/58* (2022.01); *G06V 20/588* (2022.01); *G06T 2207/30256* (2013.01); *G06V 2201/08* (2022.01)

(58) Field of Classification Search
CPC .......... G06T 7/248; G06T 2207/30256; G06T 2207/30261; G06T 2207/10016;
(Continued)

(56) References Cited

U.S. PATENT DOCUMENTS 6,429,789 B1 * 8/2002 Kiridena ............. G08G 1/0962
340/936
2012/0130561 A1 * 5/2012 Chiang ................. G08G 1/165
701/1
(Continued)

FOREIGN PATENT DOCUMENTS

EP 2955690 B1 4/2019

OTHER PUBLICATIONS

Office Action dated Mar. 12, 2024, issued in counterpart European Application No. 22216971.6 (7 pages).
(Continued)

*Primary Examiner* — Nimesh Patel
(74) *Attorney, Agent, or Firm* — WHDA, LLP

(57) ABSTRACT

An electronic device mountable in a vehicle, include a plurality of cameras disposed toward different directions of the vehicle, a memory, and a processor. The processor obtains a plurality of frames obtained by the plurality of cameras which are synchronized with each other. The processor identifies, from the plurality of frames, one or more lines included in a road in which the vehicle is disposed. The processor identifies, from the plurality of frames, one or more subjects disposed in a space adjacent to the vehicle. The processor obtains, based on the one or more lines, information for indicating locations in the space of the one or more subjects in the space. The processor stores the obtained information in the memory.

20 Claims, 21 Drawing Sheets

(58) Field of Classification Search
CPC ............. G06T 7/73; G06T 2207/30252; G06T 2207/30248; G06T 7/246; G06T 7/70; G06T 7/97; G06T 2207/20081; G06T 2207/20084; G06T 2207/30204; G06T 2207/30236; G06T 7/13; G06T 7/74; G06T 17/00; G06T 2200/04; G06T 2207/30196; G06T 7/593; G06T 7/80; G06T 13/40; G06T 2207/10012; G06T 2207/20221; G06T 5/50; G06T 7/00; G06T 7/12; G06T 7/285; G06T 7/292; G06T 7/85; G06T 13/20; G06T 19/003; G06T 19/006; G06T 3/4038; G06T 7/60; G06V 20/58; G06V 20/588; G06V 2201/08; G06V 20/56; G06V 10/82; G06V 10/764; G06V 20/46; G06V 20/52; G06V 10/25; G06V 20/584; G06V 20/64; G06V 10/255; G06V 10/806; G06V 10/765; G06V 20/582; G06V 20/47; G06V 2201/07; G06V 40/172; G06V 40/10; G08G 1/167; G08G 1/166; G08G 1/04; G08G 1/0112; G08G 1/0129; G08G 1/0133; G08G 1/16; G08G 1/165; G08G 1/01; G08G 1/052; G08G 1/0145; G08G 1/095; G08G 1/017; G08G 1/00; G08G 1/142; G08G 1/20; G08G 1/005; B60W 2420/403; B60W 50/14; B60W 30/09; B60W 10/20; B60W 30/12; B60W 2420/408; B60W 2552/30; B60W 40/02; B60W 30/16; B60W 30/18163; B60W 40/04; B60W 40/06; B60W 2552/53; B60W 2554/20; B60W 2554/4029; B60W 2554/802; B60W 30/02; B60W 30/085; B60W 2050/143; B60W 2552/05; B60W 2552/15; B60W 2552/20; B60W 2552/40; B60W 2555/20; B60W 2555/60; B60W 2556/10; B60W 60/00; G01C 21/3647; G01C 21/34; G01C 21/3492; G01C 21/3638; G01C 21/365; G01C 21/3815; G01C 21/3841; B60R 1/00; B60R 1/27; B60R 2300/105; B60R 2300/304; B60R 2300/301; B60R 2300/607; B60R 2300/802; B60T 2201/08; B60T 2201/089
See application file for complete search history.

(56) References Cited

U.S. PATENT DOCUMENTS

| | | | |
|---|---|---|---|
| 2013/0271606 A1* | 10/2013 | Chiang | H04N 7/183 |
| | | | 348/148 |
| 2017/0043773 A1* | 2/2017 | Watanabe | G06V 10/776 |
| 2017/0369057 A1* | 12/2017 | Gurghian | G06N 3/08 |
| 2018/0130353 A1* | 5/2018 | Pandurangarao | G07C 5/008 |
| 2021/0042955 A1* | 2/2021 | Lee | G06V 20/588 |

OTHER PUBLICATIONS

Extended European Search Report dated Apr. 14, 2023, issued in counterpart European Application No. 22216971.6 (10 pages).

Office Action dated Nov. 18, 2024, issued in counterpart European Application No. 22216971.6 (8 pages).

Elijah S. Lee et al., "Bird's eye view localization of surrounding vehicles: Longitudinal and lateral distance estimation with partial appearance", Robotics and Autonomous Systems, vol. 112, Nov. 30, 2018, pp. 178-189 (12 pages).

Amir Mukhtar et al., "Vehicle Detection Techniques for Collision Avoidance Systems: A Review", IEEE Transactions on Intelligent Transportation Systems, IEEE, Piscataway, NJ, USA, vol. 16, No. 5, Oct. 1, 2015, pp. 2318-2338 (21 pages).

* cited by examiner

ELECTRONIC DEVICE, METHOD, AND COMPUTER READABLE STORAGE MEDIUM FOR OBTAINING LOCATION INFORMATION OF AT LEAST ONE SUBJECT BY USING PLURALITY OF CAMERAS

CROSS-REFERENCE TO RELATED APPLICATION(S)

This application is based on and claims priority under 35 U.S.C. § 119 to Korean Patent Application No. 10-2021-0191025, filed on Dec. 29, 2021, in the Korean Intellectual Property Office, and Korean Patent Application No. 10-2022-0141865, filed on Oct. 28, 2022, in the Korean Intellectual Property Office, the disclosure of which is incorporated by reference herein in its entirety.

BACKGROUND

Technical Field

Various embodiments relate to an electronic device, a method, and a computer readable storage medium for obtaining location information of at least one subject by using a plurality of cameras.

Description of Related Art

Recently, electronic devices capable of implementing various functions by recognizing subjects in all around of the vehicle have been installed in the vehicle. The electronic devices may provide images of subjects disposed in front, side, or rear of the vehicle to the user of the electronic devices through a display screen, or may reconstruct information on the subjects and provide to the user.

SUMMARY

The electronic device capable of being mounted on the vehicle may identify a plurality of subjects disposed in an adjacent space of the vehicle by using a plurality of cameras. In order to indicate an interaction between the vehicle and the plurality of subjects, a method for obtaining a location relationship between the plurality of subjects with respect to the vehicle may be required.

The technical problems to be achieved in this document are not limited to those described above, and other technical problems not mentioned herein will be clearly understood by those having ordinary knowledge in the art to which the present disclosure belongs, from the following description.

An electronic device mountable in a vehicle according to an embodiment may comprise a plurality of cameras disposed toward different directions of the vehicle, a memory, and a processor. The processor may obtain a plurality of frames obtained by the plurality of cameras which are synchronized with each other. The processor may identify, from the plurality of frames, one or more lines included in a road in which the vehicle is disposed. The processor may identify, from the plurality of frames, one or more subjects disposed in a space adjacent to the vehicle. The processor may obtain, based on the one or more lines, information for indicating locations in the space of the one or more subjects in the space. The processor may store the obtained information in the memory.

A method of an electronic device mountable in a vehicle, may comprise an operation of obtaining a plurality of frames obtained by a plurality of cameras which are synchronized with each other. The method may identify, from the plurality of frames, one or more lines included in a road in which the vehicle is disposed. The method may comprise an operation of identifying, from the plurality of frames, one or more subjects disposed in a space adjacent to the vehicle. The method may comprise an operation of obtaining, based on the one or more lines, information for indicating locations in the space of the one or more subjects in the space. The method may comprise an operation of storing the obtained information in a memory.

A non-transitory computer readable storage medium storing one or more programs according to an embodiment, wherein the one or more programs, when being executed by a processor of an electronic device mountable in a vehicle, may obtain a plurality of frames obtained by a plurality of cameras which are synchronized with each other. For example, the one or more programs may identify, from the plurality of frames, one or more lines included in a road in which the vehicle is disposed. The one or more programs may identify, from the plurality of frames, one or more subjects disposed in a space adjacent to the vehicle. The one or more programs may obtain, based on the one or more lines, information for indicating locations in the space of the one or more subjects in the space. The one or more programs may store the obtained information in the memory.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features, and advantages of certain embodiments of the disclosure will be more apparent from the following description, taken in conjunction with the accompanying, in which.

DETAILED DESCRIPTION

Figure 1:
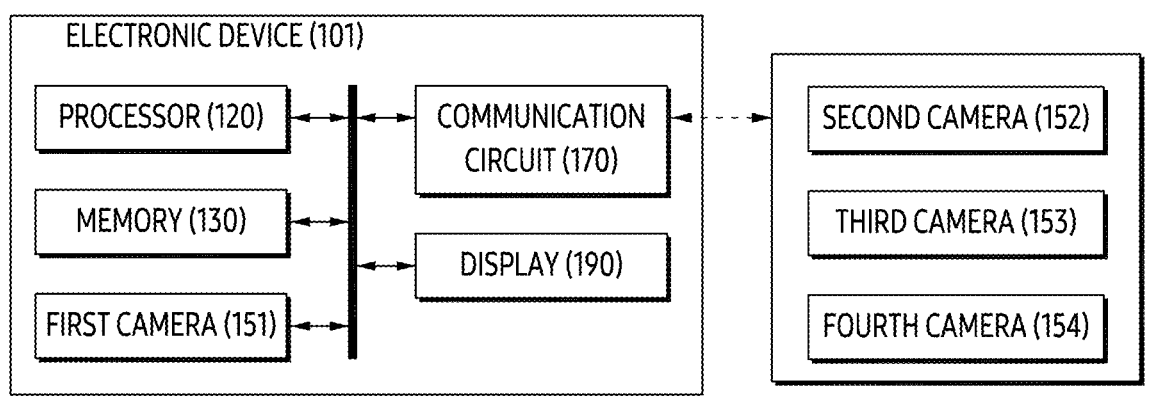
FIG. 1 illustrates an example of a block diagram of an electronic device according to an embodiment.

An electronic device mountable in a vehicle can identify a plurality of subjects disposed in an adjacent space of the vehicle by using a plurality of cameras. The electronic device, in order to indicate an interaction between the vehicle and the plurality of subjects, can obtain a location relationship between the plurality of subjects with respect to the vehicle by using a plurality of frames obtained by using the plurality of cameras.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, embodiments of the present document will be described with reference to the accompanying drawings.

FIG. 1 illustrates an example of a block diagram of an electronic device according to an embodiment. Referring to FIG. 1, an electronic device 101 according to an embodiment may comprise at least one of a processor 120, a memory 130, a plurality of cameras 150, a communication circuit 170, or a display 190. The processor 120, the memory 130, the plurality of cameras 150, the communication circuit 170, and/or the display 190 may be electronically and/or operably coupled with each other by an electronical component such as a communication bus. The type and/or number of a hardware component included in the electronic device 101 are not limited to those illustrated in FIG. 1. For example, the electronic device 101 may comprise only a part of the hardware component illustrated in FIG. 1.

The processor 120 of the electronic device 101 according to an embodiment may comprise the hardware component for processing data based on one or more instructions. The hardware component for processing data may comprise, for example, an arithmetic and logic unit (ALU), a field programmable gate array (FPGA), and/or a central processing unit (CPU). The number of the processor 120 may be one or more. For example, the processor 120 may have a structure of a multi-core processor such as a dual core, a quad core, or a hexa core.

The memory 130 of the electronic device 101 according to an embodiment may comprise the hardware component for storing data and/or instructions input and/or output to the processor 120. The memory 130 may comprise, for example, volatile memory such as random-access memory (RAM) and/or non-volatile memory such as read-only memory (ROM). The volatile memory may comprise, for example, at least one of dynamic RAM (DRAM), static RAM (SRAM), cache RAM, or pseudo SRAM (PSRAM). The non-volatile memory may comprise, for example, at least one of programmable ROM (PROM), erasable PROM (EPROM), electrically erasable PROM (EEPROM), flash memory, hard disk, compact disk, or embedded multimedia card (eMMC).

In the memory 130 of the electronic device 101 according to an embodiment, the one or more instructions indicating an operation to be performed on data by the processor 120 may be stored. A set of instructions may be referred to as firmware, operating system, process, routine, sub-routine, and/or application. For example, the electronic device 101 and/or the processor 120 of the electronic device 101 may perform the operation in FIG. 7 or FIG. 9 by executing a set of a plurality of instructions distributed in the form of the application.

A set of parameters related to a neural network may be stored in the memory 130 of the electronic device 101 according to an embodiment. A neural network may be a recognition model implemented as software or hardware that mimic the computational ability of a biological system by using a large number of artificial neurons (or nodes). The neural network may perform human cognitive action or learning process through the artificial neurons. The parameters related to the neural network may indicate, for example, weights assigned to a plurality of nodes included in the neural network and/or connections between the plurality of nodes. For example, the structure of the neural network may be related to the neural network (e.g., convolution neural network (CNN)) for processing image data based on a convolution operation. The electronic device 101 may obtain information on one or more subjects included in the image based on processing image (or frame) data obtained from at least one camera by using the neural network. The one or more subjects may comprise a vehicle, a bike, a line, a road, and/or a pedestrian. For example, the information on the one or more subjects may comprise the type of the one or more subjects (e.g., vehicle), the size of the one or more subjects, the distance between the one or more subjects, and/or electronic devices 101. The neural network may be an example of a neural network learned to identify information on the one or more subjects included in a plurality of frames obtained by the plurality of cameras 150. An operation in which the electronic device 101 obtains information on the one or more subjects included in the image will be described later in FIGS. 3A to 6.

The plurality of cameras 150 of the electronic device 101 according to an embodiment may comprise one or more optical sensors (e.g., Charged Coupled Device (CCD) sensors, Complementary Metal Oxide Semiconductor (CMOS) sensors) that generate an electrical signal indicating the color and/or brightness of light. The plurality of optical sensors included in the plurality of cameras 150 may be disposed in the form of a 2-dimensional array. The plurality of cameras 150, by obtaining the electrical signals of each of the plurality of optical sensors substantially simultaneously, may respond to light reaching the optical sensors of the 2-dimensional array and may generate images or frames including a plurality of pixels arranged in 2-dimensions. For example, photo data captured by using the plurality of cameras 150 may mean a plurality of images obtained from the plurality of cameras 150. For example, video data captured by using the plurality of cameras 150 may mean a sequence of the plurality of images obtained from the plurality of cameras 150 according to a designated frame rate. The electronic device 101 according to an embodiment may be disposed toward a direction in which the plurality of cameras 150 receive light, and may further include a flashlight for outputting light in the direction. Locations where each of the plurality of cameras 150 is disposed in the vehicle will be described later in FIGS. 2A to 2B.

For example, each of the plurality of cameras 150 may have an independent direction and/or Field-of-View (FOV) within the electronic device 101. The electronic device 101 according to an embodiment may identify the one or more subjects included in the frames by using frames obtained by each of the plurality of cameras 150.

The electronic device 101 according to an embodiment may establish a connection with at least a part of the plurality of cameras 150. Referring to FIG. 1, the electronic device 101 may comprise a first camera 151, and may establish a connection with a second camera 152, a third camera 153, and/or a fourth camera 154 different from the first camera. For example, the electronic device 101 may establish a connection with the second camera 152, the third camera 153, and/or the fourth camera 154 directly or indirectly by using the communication circuit 170. For example, the electronic device 101 may establish a connection with the second camera 152, the third camera 153, and/or the fourth camera 154 by wire by using a plurality of cables. For example, the second camera 152, the third camera 153, and/or the fourth camera 154 may be referred to as an example of an external camera in that they are disposed outside the electronic device 101.

The communication circuit 170 of the electronic device 101 according to an embodiment may comprise the hardware component for supporting transmission and/or reception of signals between the electronic device 101 and the plurality of cameras 150. The communication circuit 170 may comprise, for example, at least one of a modem (MODEM), an antenna, or an optical/electronic (O/E) converter. For example, the communication circuit 170 may support transmission and/or reception of signals based on various types of protocols such as Ethernet, local area network (LAN), wide area network (WAN), wireless fidelity (WiFi), Bluetooth, Bluetooth low energy (BLE), ZigBee, long term evolution (LTE), and 5G NR (new radio). The electronic device 101 may be interconnected with the plurality of cameras 150 based on a wired network and/or a wireless network. For example, the wired network may comprise a network such as the Internet, a local area network (LAN), a wide area network (WAN), Ethernet, or a combination thereof. The wireless network may comprise a network such as long term evolution (LTE), 5g new radio (NR), wireless fidelity (WiFi), Zigbee, near field communication (NFC), Bluetooth, Bluetooth low-energy (BLE), or a combination thereof. In FIG. 1, the electronic device 101 is illustrated as being directly connected to the plurality of cameras 152, 153, and 154, but is not limited thereto. For example, the electronic device 101 and the plurality of cameras 152, 153, and 154 may be indirectly connected through one or more routers and/or one or more access points (APs).

The electronic device 101 according to an embodiment may establish a connection by wireless by using the plurality of cameras 150 and the communication circuit 170, or may establish a connection by wire by using a plurality of cables disposed in the vehicle. The electronic device 101 may synchronize the plurality of cameras 150 by wireless and/or by wire based on the established connection. For example, the electronic device 101 may control the plurality of synchronized cameras 150 based on a plurality of channels. For example, the electronic device 101 may obtain a plurality of frames based on the same timing by using the plurality of synchronized cameras 150.

The display 190 of the electronic device 101 according to an embodiment may be controlled by a controller such as the processor 120 to output visualized information to a user. The display 190 may comprise a flat panel display (FPD) and/or electronic paper. The FPD may comprise a liquid crystal display (LCD), a plasma display panel (PDP), and/or one or more light emitting diodes (LEDs). The LED may comprise an organic LED (OLED). For example, the display 190 may be used to display an image obtained by the processor 120 or a screen (e.g., top-view screen) obtained by a display driving circuit. For example, the electronic device 101 may display the image on a part of the display 190 according to the control of the display driving circuit. However, it is not limited thereto.

As described above, the electronic device 101, by using the plurality of cameras 150, may identify one or more lines included in the road on which the vehicle on which the electronic device 101 is mounted is disposed and/or a plurality of vehicles different from the vehicle. The electronic device 101 may obtain information on the lines and/or the plurality of different vehicles based on frames obtained by using the plurality of cameras 150. The electronic device 101 may store the obtained information in the memory 130 of the electronic device 101. The electronic device 101 may display a screen corresponding to the information stored in the memory in the display 190. The electronic device 101 may provide a user with a surrounding state of the vehicle while the vehicle on which the electronic device 101 is mounted is moving based on displaying the screen in the display 190. Hereinafter, in FIGS. 2A to 2B, an operation in which the electronic device 101 obtains frames with respect to the outside of a vehicle on which the electronic device 101 is mounted by using the plurality of cameras 150 will be described later.

Figure 2A:
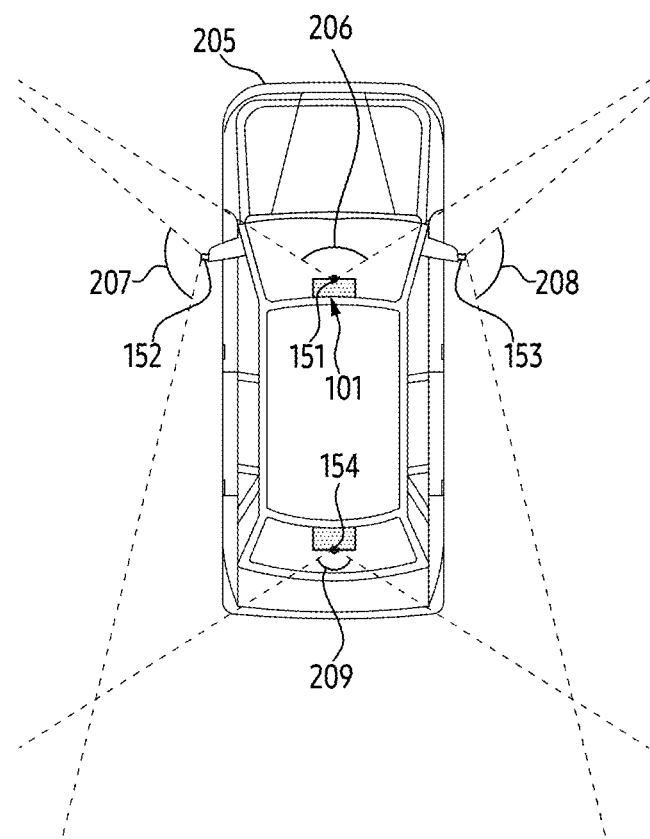
FIGS. 2A to 2C illustrate exemplary states indicating obtaining of a plurality of frames using an electronic device disposed in a vehicle according to an embodiment.
Figure 2B:
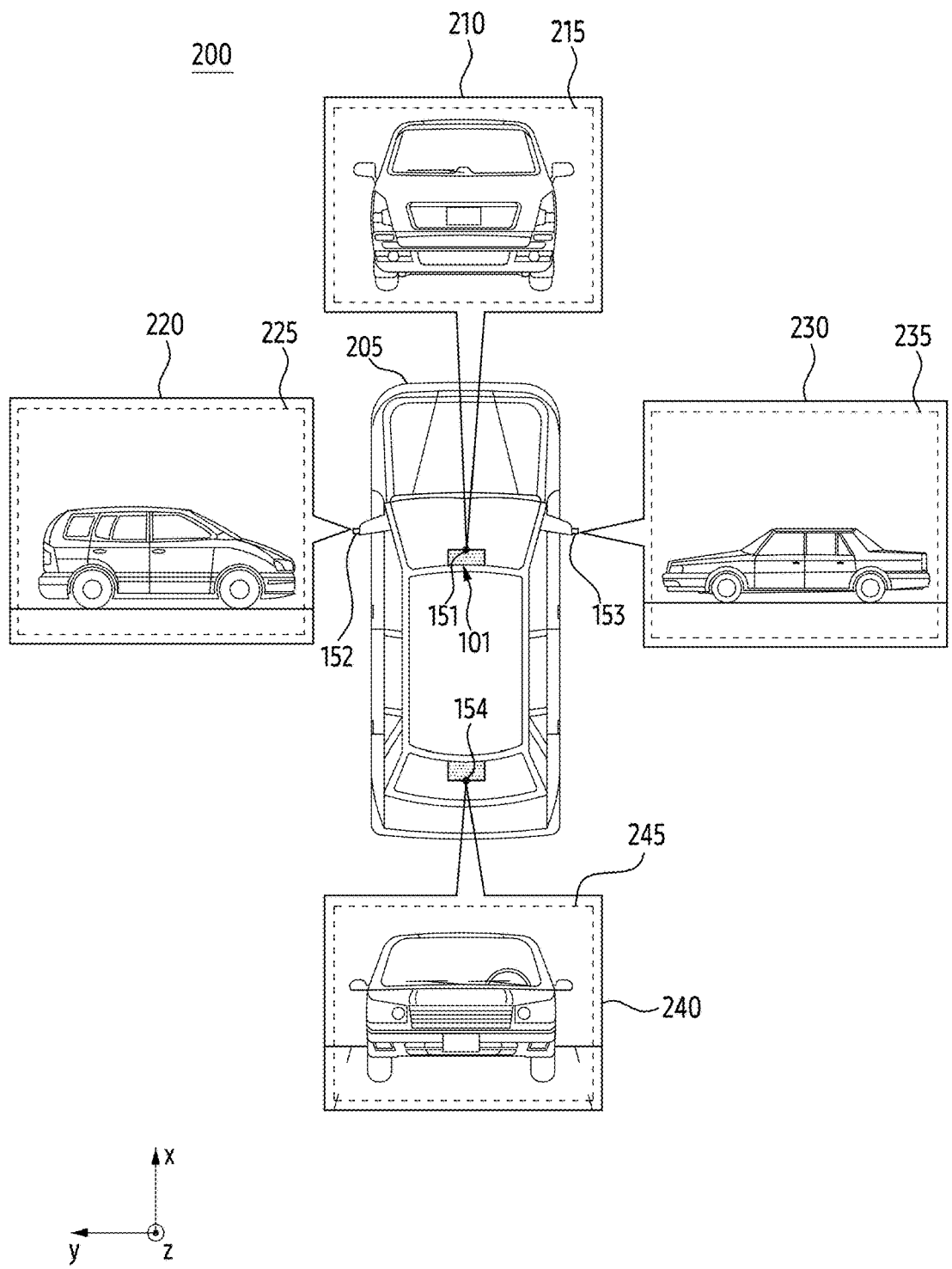
Figure 2C:
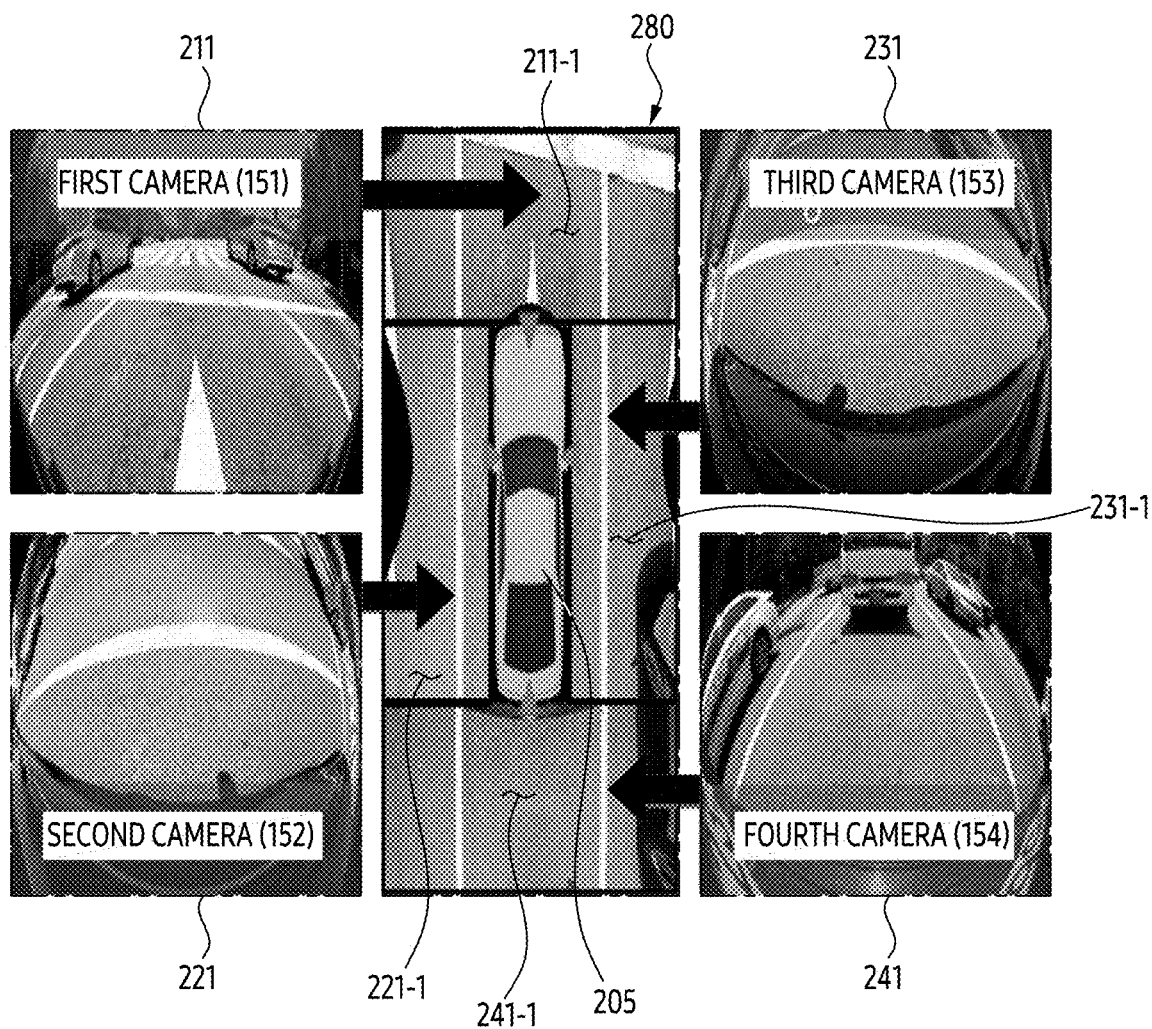

FIGS. 2A to 2C illustrate exemplary states indicating obtaining of a plurality of frames using an electronic device disposed in a vehicle according to an embodiment. Referring to FIGS.

2A to 2B, an exterior of a vehicle 205 on which an electronic device 101 is mounted is illustrated. The electronic device 101 may be referred to the electronic device 101 in FIG. 1. The plurality of cameras 150 may be referred to the plurality of cameras 150 in FIG. 1. For example, the electronic device 101 may establish a connection by wireless by using the plurality of cameras 150 and the communication circuit (e.g., the communication circuit 170 in FIG. 1). For example, the electronic device 101 may establish a connection with the plurality of cameras 150 by wire by using a plurality of cables. The electronic device 101 may synchronize the plurality of cameras 150 based on the established connection. For example, angles of view 206, 207, 208, and 209 of each of the plurality of cameras 150 may be different from each other. For example, each of the angles of view 206, 207, 208, and 209 may be 100 degrees or more. For example, the sum of the angles of view 206, 207, 208, and 209 of each of the plurality of cameras 150 may be 360 degrees or more.

Referring to FIGS. 2A to 2B, the electronic device 101 may be an electronic device included in the vehicle 205. For example, the electronic device 101 may be embedded in the vehicle 205 before the vehicle 205 is released. For example, the electronic device 101 may be embedded in the vehicle 205 based on a separate process after the vehicle 205 is released. For example, the electronic device 101 may be mounted on the vehicle 205 so as to be detachable after the vehicle 205 is released. However, it is not limited thereto.

Referring to FIG. 2A, the electronic device 101 according to an embodiment may be located on at least a part of the vehicle 205. For example, the electronic device 101 may comprise a first camera 151. For example, the first camera 151 may be disposed such that the direction of the first camera 151 faces the moving direction of the vehicle 205 (e.g., +x direction). For example, the first camera 151 may be disposed such that an optical axis of the first camera 151 faces the front of the vehicle 205. For example, the first camera 151 may be located on a dashboard, an upper part of a windshield, or in a room mirror of the vehicle 205.

The second camera 152 according to an embodiment may be disposed on the left side surface of the vehicle 205. For example, the second camera 152 may be disposed to face the left direction (e.g., +y direction) of the moving direction of the vehicle 205. For example, the second camera 152 may be disposed on a left side mirror or a wing mirror of the vehicle 205.

The third camera 153 according to an embodiment may be disposed on the right side surface of the vehicle 205. For example, the third camera 153 may be disposed to face the right direction (e.g., −y direction) of the moving direction of the vehicle 205. For example, the third camera 153 may be disposed on a side mirror or a wing mirror of the right side of the vehicle 205.

The fourth camera 154 according to an embodiment may be disposed toward the rear (e.g., -x direction) of the vehicle 205. For example, the fourth camera 154 may be disposed at an appropriate location of the rear of the vehicle 205.

Referring to FIG. 2B, a state 200 in which the electronic device 101 mounted on the vehicle 205 obtains a plurality of frames 210, 220, 230, and 240 by using the plurality of cameras 150.) is illustrated. The electronic device 101 according to an embodiment may obtain a plurality of frames including one or more subjects disposed in the front, side, and/or rear of the vehicle 205 by using the plurality of cameras 150.

According to an embodiment, the electronic device 101 may obtain first frames 210 including the one or more subjects disposed in front of the vehicle by the first camera 151. For example, the electronic device 101 may obtain the first frames 210 based on the angle of view 206 of the first camera 151. For example, the electronic device 101 may identify the one or more subjects included in the first frames 210 by using the neural network. The neural network may be an example of a neural network trained to identify the one or more subjects included in the frames 210. For example, the neural network may be a neural network pre-trained based on a single shot detector (SSD) and/or you only look once (YOLO). However, it is not limited to the above-described embodiment.

For example, the electronic device 101 may use the bounding box 215 to detect the one or more subjects within the first frames 210 obtained by using the first camera 151. The electronic device 101 may identify the size of the one or more subjects by using the bounding box 215. For example, the electronic device 101 may identify the size of the one or more subjects based on the size of the first frames 210 and the size of the bounding box 215. For example, the length of an edge (e.g., width) of the bounding box 215 may correspond to the horizontal length of the one or more subjects. For example, the length of the edge may correspond to the width of the vehicle. For example, the length of another edge (e.g., height) different from the edge of the bounding box 215 may correspond to the vertical length of the one or more subjects. For example, the length of another edge may correspond to the height of the vehicle. For example, the electronic device 101 may identify the size of the one or more subjects disposed in the bounding box 215 based on a coordinate value corresponding to a corner of the bounding box 215 in the first frames 210.

According to an embodiment, the electronic device 101, by using the second camera 152, may obtain second frames 220 including the one or more subjects disposed on the left side of the moving direction of the vehicle 205 (e.g., +x direction). For example, the electronic device 101 may obtain the second frames 220 based on the angle of view 207 of the second camera 152.

For example, the electronic device 101 may identify the one or more subjects in the second frames 220 obtained by using the second camera 152 by using the bounding box 225. The electronic device 101 may obtain the sizes of the one or more subjects by using the bounding box 225. For example, the length of an edge of the bounding box 225 may correspond to the length of the vehicle. For example, the length of another edge, which is different from the one edge of the bounding box 215, may correspond to the height of the vehicle. For example, the electronic device 101 may identify the size of the one or more subjects disposed in the bounding box 215 based on a coordinate value corresponding to a corner of the bounding box 215 in the first frames 210.

According to an embodiment, the electronic device 101, by using the third camera 153, may obtain the third frames 230 including the one or more subjects disposed on the right side of the moving direction (e.g., +x direction) of the vehicle 205. For example, the electronic device 101 may obtain the third frames 230 based on the angle of view 208 of the third camera 153. For example, the electronic device 101 may use the bounding box 235 to identify the one or more subjects within the third frames 230. The size of the bounding box 235 may correspond to at least a part of the sizes of the one or more subjects. For example, the size of the one or more subjects may comprise the width, height, and/or length of the vehicle.

According to an embodiment, the electronic device 101, by using the fourth camera 154, may obtain the fourth frames including the one or more subjects disposed at the rear of the vehicle 205 (e.g., −x direction). For example, the electronic device 101 may obtain the fourth frames 240 based on the angle of view 209 of the fourth camera 154. For example, the electronic device 101 may use the bounding box 245 to detect the one or more subjects included in the fourth frames 240. For example, the size of the bounding box 245 may correspond to at least a part of the sizes of the one or more subjects.

The electronic device 101 according to an embodiment may identify subjects included in each of the frames 210, 220, 230, and 240 and the distance between the electronic devices 101 by using bounding boxes 215, 225, 235, and 245. For example, the electronic device 101 may obtain the width of the subject (e.g., the width of the vehicle) by using the bounding box 215 and/or the bounding box 245. The electronic device 101 may identify the distance between the electronic device 101 and the subject based on the type (e.g., sedan, truck) of the subject stored in the memory and/or the width of the obtained subject.

For example, the electronic device 101 may obtain the length of the subject (e.g., the length of the vehicle) by using the bounding box 225 and/or the bounding box 235. The electronic device 101 may identify the distance between the electronic device 101 and the subject based on the type of the subject stored in memory and/or the obtained length of the subject.

The electronic device 101 according to an embodiment may correct the plurality of frames 210, 220, 230, and 240 obtained by the plurality of cameras 150 by using at least one neural network stored in a memory (e.g., the memory 130 in FIG. 1). For example, the electronic device 101 may calibrate the image by using the at least one neural network. For example, the electronic device 101 may obtain a parameter corresponding to the one or more subjects included in the plurality of frames 210, 220, 230, and 240 based on calibration of the plurality of frames 210, 220, 230, and 240.

For example, the electronic device 101 may remove noise included in the plurality of frames 210, 220, 230, and 240 by calibrating the plurality of frames 210, 220, 230, and 240. The noise may be a parameter corresponding to an object different from the one or more subjects included in the plurality of frames 210, 220, 230, and 240. For example, the electronic device 101 may obtain information on the one or more subjects (or objects) based on calibration of the plurality of frames 210, 220, 230, and 240. For example, the information may comprise the location of the one or more subjects, the type of the one or more subjects (e.g., vehicle, bus, and/or truck), the size of the one or more subjects (e.g., the width of the vehicle, or the length of the vehicle), the number of the one or more subjects, and/or the time information in which the one or more subjects are captured in the plurality of frames 210, 220, 230, and 240. However, it is not limited thereto. For example, information on the one or more subjects may be indicated as shown in Table 1.

TABLE 1

| line number | data format | content |
| --- | --- | --- |
| 1 | time information (or frame) | time information (or frame order) corresponding to each of the |

TABLE 1-continued

| line number | data format | content |
|---|---|---|
| | | frames |
| 2 | camera | First camera 151 [front], second camera 152 [left side], third camera 153 [right side], fourth camera 154 [rear] |
| 3 | number of objects | number of objects included in frames |
| 4 | object number | object number |
| 5 | object type | sedan, bus, truck, compact car, bike, human |
| 6 | object location information | location coordinates (x, y) of an object based on a 2-dimensional coordinate system |

For example, referring to line number 1 in Table 1 described above, the time information may mean time information on each of the frames obtained from a camera, and/or an order for frames. Referring to line number 2, the camera may mean a camera obtained each of the frames. For example, the camera may comprise the first camera 151, the second camera 152, the third camera 153, and/or the fourth camera 154. Referring to line number 3, the number of objects may mean the number of objects (or subjects) included in each of the frames. Referring to line number 4, the object number may mean an identifier number (or index number) corresponding to objects included in each of the frames. The index number may mean an identifier set by the electronic device 101 corresponding to each of the objects in order to distinguish the objects. Referring to line number 5, the object type may mean a type for each of the objects. For example, types may be classified into a sedan, a bus, a truck, a light vehicle, a bike, and/or a human. Referring to line number 6, the object location information may mean a relative distance between the electronic device 101 and the object obtained by the electronic device 101 based on the 2-dimensional coordinate system. For example, the electronic device 101 may obtain a log file by using each information in a data format. For example, the log file may be indicated as "[time information] [camera] [object number] [type] [location information corresponding to object number]". For example, the log file may be indicated as "[2022-09-22-08-29-48][F][3][1: sedan,30,140][2:truck, 120,45][3:bike,400,213]". For example, information indicating the size of the object according to the object type may be stored in the memory.

The log file according to an embodiment may be indicated as shown in Table 2 below.

TABLE 2

| line number | field | description |
|---|---|---|
| 1 | [2022-09-22-08-29-48] | Image captured time information |
| 2 | [F] | camera location information<br>[F]: Forward<br>[R]: Rear<br>[LW]: Left wing, Left side<br>[RW]: Right wing, Right side |
| 3 | [3] | number of detected objects in the obtained image |
| 4 | [1: sedan, 30, 140] | 1: identifier assigned to identify detected objects in the obtained image (indicating the first object among the total of three detected objects)<br>sedan: indicates that the object type of the detected object is Sedan<br>30: location information on the x-axis from the Ego vehicle (e.g., the vehicle 205 in FIG. 2A),<br>140: location information on the y-axis from the Ego vehicle |
| 5 | [2: truck, 120, 45] | 2: identifier assigned to identify detected objects in the obtained image (indicating the second object among the total of three detected objects)<br>truck: indicates that the object type of the detected object is a truck<br>120: location information on the x-axis from the Ego vehicle (e.g., the vehicle 205 in FIG. 2A),<br>45: location information on the y-axis from the Ego vehicle |
| 6 | [3: bike, 400, 213] | 3: identifier assigned to identify detected objects in the obtained image (indicating the third object among the total of three detected objects)<br>bike: indicates that the object type of the detected object is a bike<br>400: location information on the x-axis from the ego vehicle (e.g., the vehicle 205 in FIG. 2A),<br>213: location information on the y-axis from the Ego vehicle |

Referring to line number 1 in Table 2 described above, the electronic device 101 may store information on the time at which the image is obtained in a log file by using a camera. Referring to line number 2, the electronic device 101 may store information indicating a camera used to obtain the image (e.g., at least one of the plurality of cameras 150 in FIG. 2A) in a log file. Referring to line number 3, the electronic device 101 may store the number of objects included in the image in a log file. Referring to line number 4, line number 5, and/or line number 6, the electronic device 101 may store type and/or location information on one of the objects included in the image in a log file. However, it is not limited thereto. In Table 2 described above, only a total of three object types are displayed, but this is only an example, and it will be natural that they may be specifically subdivided into other objects (e.g., bus, sports utility vehicle (SUV), pick-up truck, dump truck, mixer truck, excavator, and the like) according to pre-trained models.

For example, the electronic device 101 may store the obtained information in a log file of a memory (e.g., the memory 130 in FIG. 1) of the electronic device 101. For example, the electronic device 101 may store in the log file by obtaining information on the one or more subjects from each of the plurality of frames 210, 220, 230, and 240.

According to an embodiment, the electronic device 101 may infer motion of the one or more subjects by using the log file. Based on the inferred motion of the one or more subjects, the electronic device 101 may control a moving direction of a vehicle in which the electronic device 101 is mounted. An operation in which the electronic device 101 controls the moving direction of the vehicle in which the electronic device 101 is mounted will be described later in FIG. 13.

Referring to FIG. 2C, the electronic device 101 according to an embodiment may generate the image 280 by using frames obtained from the cameras 150. The image 280 may be referred to a top view image. The image 280 may be generated by using one or more images. For example, the image 280 may comprise a visual object indicating the vehicle 205. For example, the image 211 may be at least one of the first frames 210. The image 221 may be at least one of the second frames 220. The image 231 may be at least one of the third frames 230. The image 241 may be at least one of the fourth frames 240.

For example, the electronic device 101 may change the images 211, 221, 231, and 241 respectively by using at least one function (e.g., homography matrix). Each of the changed images 211, 221, 231, and 241 may correspond to the images 211-1, 221-1, 231-1, and 241-1. An operation in which the electronic device 101 uses the obtained image 280 by using the images 211-1, 221-1, 231-1, and 241-1 will be described later in FIGS. 8A to 8B. The electronic device 101 according to an embodiment may obtain the image 280 by using the four cameras 150 disposed in the vehicle 205. However, it is not limited thereto.

As described above, the electronic device 101, mountable in the vehicle 205, may comprise the plurality of cameras 150 or may establish a connection with the plurality of cameras 150. The electronic device 101 and/or the plurality of cameras 150 may be mounted within different parts of the vehicle 205, respectively. The sum of the angles of view 206, 207, 208, and 209 of the plurality of cameras 150 mounted on the vehicle 205 may have a value of 360 degrees or more. For example, by using the plurality of cameras 150 disposed facing each direction of the vehicle 205, the electronic device 101 may obtain the plurality of frames 210, 220, 230, and 240 including the one or more subjects located around the vehicle 205. The electronic device 101 may obtain a parameter (or feature value) corresponding to the one or more subjects by using a pre-trained neural network. The electronic device 101 may obtain information on the one or more subjects (e.g., vehicle size, vehicle type, time and/or location relationship) based on the obtained parameter. Hereinafter, in FIGS. 3 to 6, an operation in which the electronic device 101 identifies at least one subject by using a camera disposed facing one direction will be described later.

Figure 3A:
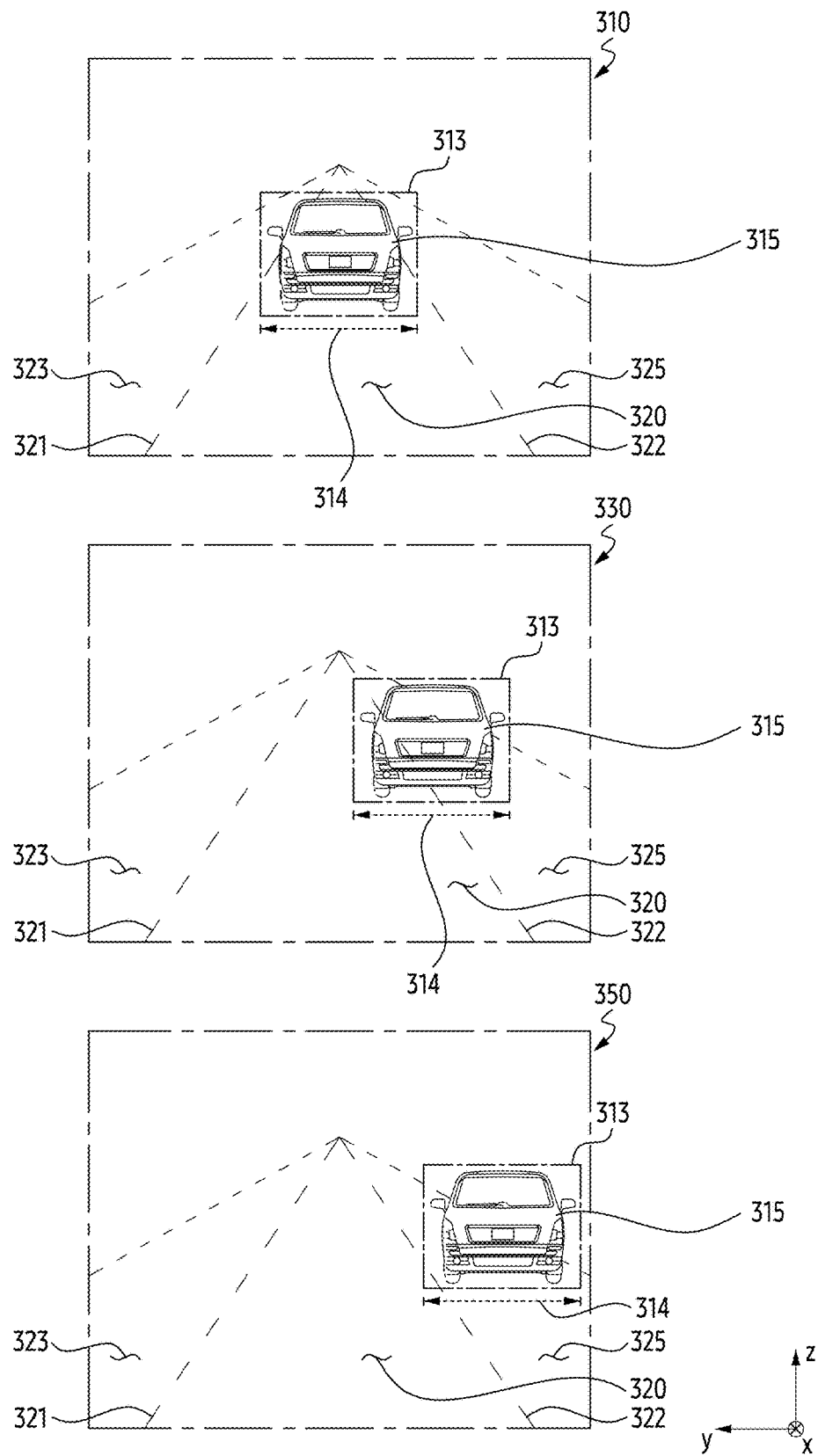
FIGS. 3A to 3B illustrate an example of frames including information on a subject that an electronic device obtained by using a first camera disposed in front of a vehicle, according to an embodiment.
Figure 3B:
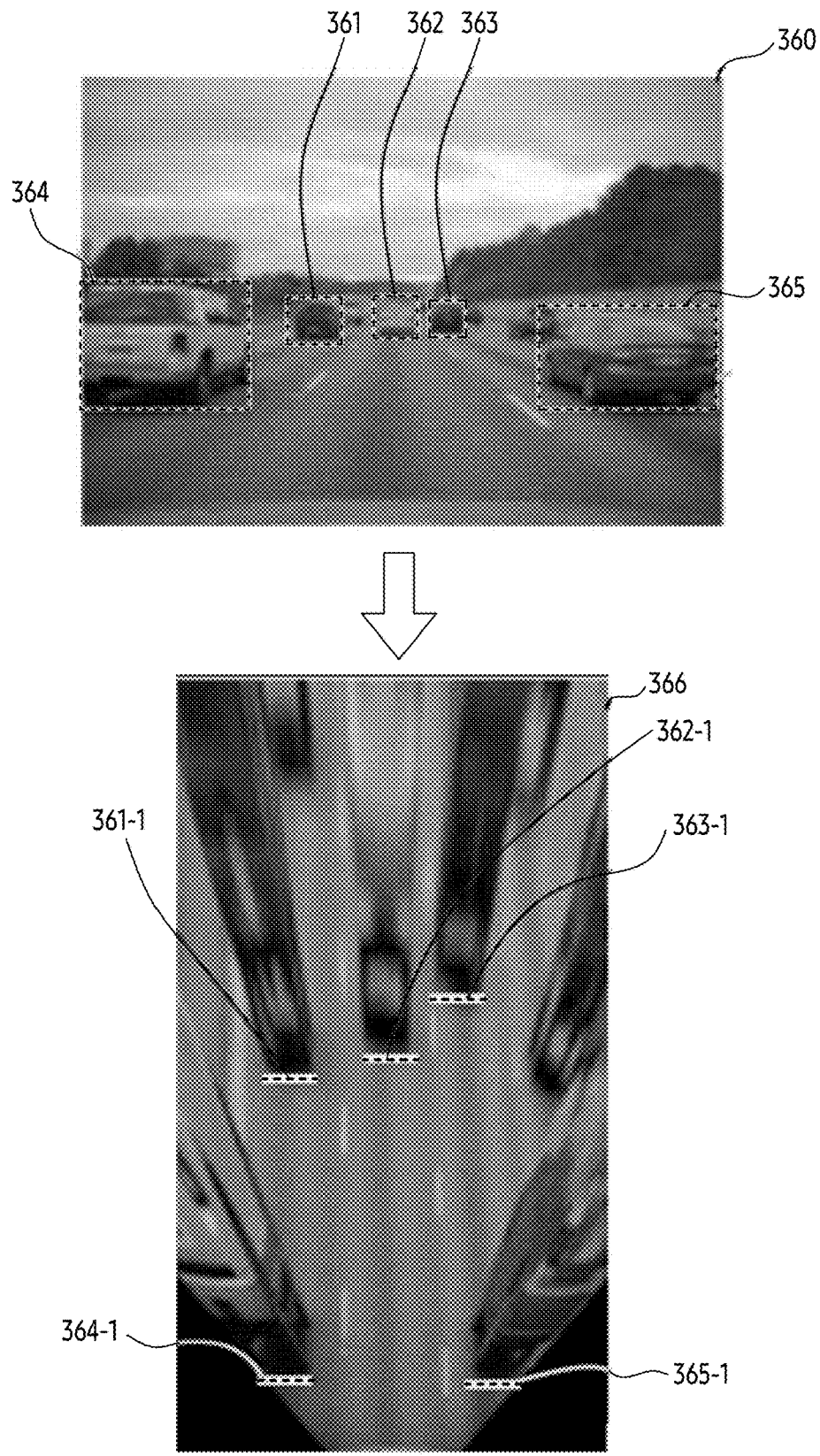

FIGS. 3A to 3B illustrate an example of frames including information on a subject that an electronic device obtained by using a first camera disposed in front of a vehicle, according to an embodiment. Referring to FIG. 3A, the images 310, 330, and 350 corresponding to one frame of the first frames (e.g., first frames 210 in FIG. 2B) obtained by the first camera (e.g., first camera 151 in FIG. 1) disposed toward the moving direction (e.g., +x direction) of the vehicle (e.g., vehicle 205 in FIG. 2A) by the electronic device 101 in FIG. 1 are illustrated. The electronic device 101 may obtain different information in the images 310, 330, and 350. The electronic device may correspond to the electronic device 101 in FIG. 1.

According to an embodiment, the electronic device 101 may obtain an image 310 about the front of the vehicle by using a first camera (e.g., the first camera 151 in FIG. 2A) while the vehicle on which the electronic device 101 is mounted (e.g., the vehicle 205 in FIG. 2A) moves toward one direction (e.g., +x direction). For example, the electronic device 101 may identify one or more subjects in the image 310. For example, the image 310 may comprise the vehicle 315 disposed in front of the vehicle on which the electronic device is mounted (e.g., the vehicle 205 in FIG. 2A), the lines 321 and 322, and/or lanes 320, 323, and 325 divided by lines within the road. The electronic device 101 may identify the vehicle 315, lines 321 and 322, and/or lanes 320, 323, and 325 in the image 310. For example, although not illustrated, the electronic device 101 may identify natural objects, traffic lights, road signs, humans, bikes, and/or animals in the image 310. However, it is not limited thereto.

For example, in the image 310, the vehicle 315 may be an example of a vehicle 315 that is disposed on the same lane 320 as the vehicle (e.g., vehicle 205 in FIG. 2A) in which the electronic device 101 is mounted and is disposed in front of the vehicle (e.g., the vehicle 205 in FIG. 2) in which the electronic device 101 is mounted. For example, referring to FIG. 3A, one vehicle 315 disposed in front of the vehicle (e.g., the vehicle 205 in FIG. 2) is illustrated, but is not limited thereto. For example, the images 310, 330, and 350 may comprise one or more vehicles. For example, the electronic device 101 may set an identifier for the vehicle 315. For example, the identifier may mean an index code set by the electronic device 101 to track the vehicle 315.

For example, the electronic device 101 may obtain a plurality of parameters corresponding to the vehicle 315, the lines 321, 322, and/or the lanes 320, 323, 325 by using a neural network stored in the memory (e.g., the memory 130 in FIG. 1). For example, the electronic device 101 may identify a type of the vehicle 315 based on a parameter corresponding to the vehicle 315. The vehicle 315 may be classified into a sedan, a sport utility vehicle (SUV), a recreational vehicle (RV), a hatchback, a truck, a bike, or a bus. For example, the electronic device 101 may identify the type of the vehicle 315 by using information on the exterior of the vehicle 315 including the tail lamp, license plate, and/or tire of the vehicle 315. However, it is not limited thereto.

According to an embodiment, the electronic device 101 may identify a distance from the vehicle 315 and/or a location of the vehicle 315 based on the locations of the lines 321, 322, the lanes 320, 323, 325, and the first camera (e.g., the first camera 151 in FIG. 2A), the magnification of the first camera, the angle of view of the first camera (e.g., the angle of view 206 in FIG. 2A) and/or the width of the vehicle 315.

According to an embodiment, the electronic device 101 may obtain information on the location of the vehicle 315 (e.g., the location information in Table 1) based on the distance from the vehicle 315 and/or the type of the vehicle 315. For example, the electronic device 101 may obtain the width 314 by using a size representing the type (e.g., sedan) of the vehicle 315.

According to an embodiment, the width 314 may be obtained by the bounding box 313 used by the electronic device 101 to identify the vehicle 315 in the image 310. The width 314 may correspond to, for example, a horizontal length among line segments of the bounding box 313 of the vehicle 315. For example, the electronic device 101 may obtain a numerical value of the width 314 by using pixels corresponding to the width 314 in the image 310. The electronic device 101 may obtain a relative distance between the electronic device 101 and the vehicle 315 by using the width 314.

The electronic device 101 may obtain a log file for the vehicle 315 by using the lines 321 and 322, the lanes 320, 323 and 325, and/or the width 314. Based on the obtained log file, the electronic device 101 may obtain location information (e.g., coordinate value based on 2-dimensions) of a visual object corresponding to the vehicle 315 to be disposed in the top view image. An operation in which the electronic device 101 obtains the top view image will be described later in FIG. 3B.

The electronic device 101 according to an embodiment may identify vehicle 315 in image 330, which is being cut in and/or cut out. For example, the electronic device 101 may identify the movement of the vehicle 315 overlapped on the line 322 in the image 330. The electronic device 101 may track the vehicle 315 based on the identified movement. The electronic device 101 may identify the vehicle 315 included in the image 330 and the vehicle 315 included in the image 310 as the same object (or subject) by using an identifier for the vehicle 315. For example, the electronic device 101 may use the images 310, 330, and 350 configured as a series of sequences within the first frames (e.g., the first frames 210 in FIG. 2B) obtained by using the first camera (e.g., the first camera 151 in FIG. 2A) for the tracking. For example, the electronic device 101 may identify a change between the location of the vehicle 315 within the image 310 and the location of the vehicle 315 within the image 330 after the image 310. For example, the electronic device 101 may predict that the vehicle 315 will be moved from the lane 320 to the lane 325, based on the identified change. For example, the electronic device 101 may store information on the location of the vehicle 315 in a memory.

The electronic device 101 according to an embodiment may identify the vehicle 315 moved from the lane 320 to the lane 325 within the image 350. For example, the electronic device 101 may generate the top view image by using the first frames (e.g., the first frames 210 in FIG. 2B) including images 310, 330, and 350 based on information on the location of the vehicle 315 and/or information on the lines 321 and 322. An operation in which the electronic device 101 generates the top view image will be described later in FIG. 3B.

Referring to FIG. 3B, the electronic device 101 according to an embodiment may identify the one or more subjects included in the image 360. The electronic device 101 may identify the one or more subjects by using each of the bounding boxes 361, 362, 363, 364, and 365 corresponding to each of the one or more subjects. For example, the electronic device 101 may obtain location information on each of the one or more subjects by using the bounding boxes 361, 362, 363, 364, and 365.

For example, the electronic device 101 may transform the image 360 by using at least one function (e.g., homography matrix). The electronic device 101 may obtain the image 366 by projecting the image 360 to one plane by using the at least one function. For example, the line segments 361-1, 362-1, 363-1, 364-1, and 365-1 may mean a location where the bounding boxes 361, 362, 363, 364, and 365 are displayed in the image 366. The line segments 361-1, 362-1, 363-1, 364-1, and 365-1 included in the image 366 according to an embodiment may correspond to the one line segment of each of the bounding boxes 361, 362, 363, 364, and 365. The line segments 361-1, 362-1, 363-1, 364-1, and 365-1 may be referred to the width of each of the one or more subjects. For example, the line segment 361-1 may be referred to the width of the bounding box 361. The line segment 362-1 may be referred to the width of the bounding box 362. The line segment 363-1 may be referred to the width of the bounding box 363. The line segment 364-1 may be referred to the width of the bounding box 364. The line segment 365-1 may be referred to the width of the bounding box 365. However, it is not limited thereto. For example, the electronic device 101 may generate the image 366 based on identifying the one or more subjects (e.g., vehicles), lanes, and/or lines included in the image 360.

The image 366 according to an embodiment may correspond to an image for obtaining the top view image. The image 366 according to an embodiment may be an example of an image obtained by using the image 360 obtained by a front camera (e.g., the first camera 151) of the electronic device 101. The electronic device 101 may obtain a first image different from the image 366 by using frames obtained by using the second camera 152. The electronic device 101 may obtain a second image by using frames obtained by using the third camera 153. The electronic device 101 may obtain a third image by using frames obtained by using the fourth camera 154. Each of the first image, the second image, and/or the third image may comprise one or more bounding boxes for identifying at least one subject. The electronic device 101 may obtain an image (e.g., top view image) based on information of at least one subject included in the image 366, the first image, the second image, and/or the third image.

As described above, the electronic device 101 mounted on the vehicle (e.g., the vehicle 205 in FIG. 2A) may identify the vehicle 315, the lines 321, 322, and/or the lanes 320, 323, 325 which are different from the vehicle located in front of the vehicle by using a first camera (e.g., the first camera 151 in FIG. 2A). For example, the electronic device 101 may identify the type of the vehicle 315 and/or the size of the vehicle 315, based on the exterior of the vehicle 315. For example, the electronic device 101 may identify relative location information (e.g., the location information of Table 1) between the electronic device 101 and the vehicle 315 based on the lines 321 and 322, the type of the vehicle 315, and/or the size of the vehicle 315.

For example, the electronic device 101 may store information on the vehicle 315 (e.g., the type of vehicle 315 and the location of the vehicle) in a log file of a memory. The electronic device 101 may display a plurality of frames corresponding to the timing at which the vehicle 315 is captured through the log file on the display (e.g., the display 190 in FIG. 1). For example, the electronic device 101 may generate the plurality of frames by using a log file. The generated plurality of frames may be referred to a top view image (or a bird eye view image). An operation in which the electronic device 101 uses the generated plurality of frames will be described later in FIGS. 8A and 8B. Hereinafter, in FIGS. 4A to 5B, an operation in which the electronic device 101 identifies the one or more subjects located on the side of a vehicle in which the electronic device 101 is mounted by using a plurality of cameras will be described below.

Figure 4A:
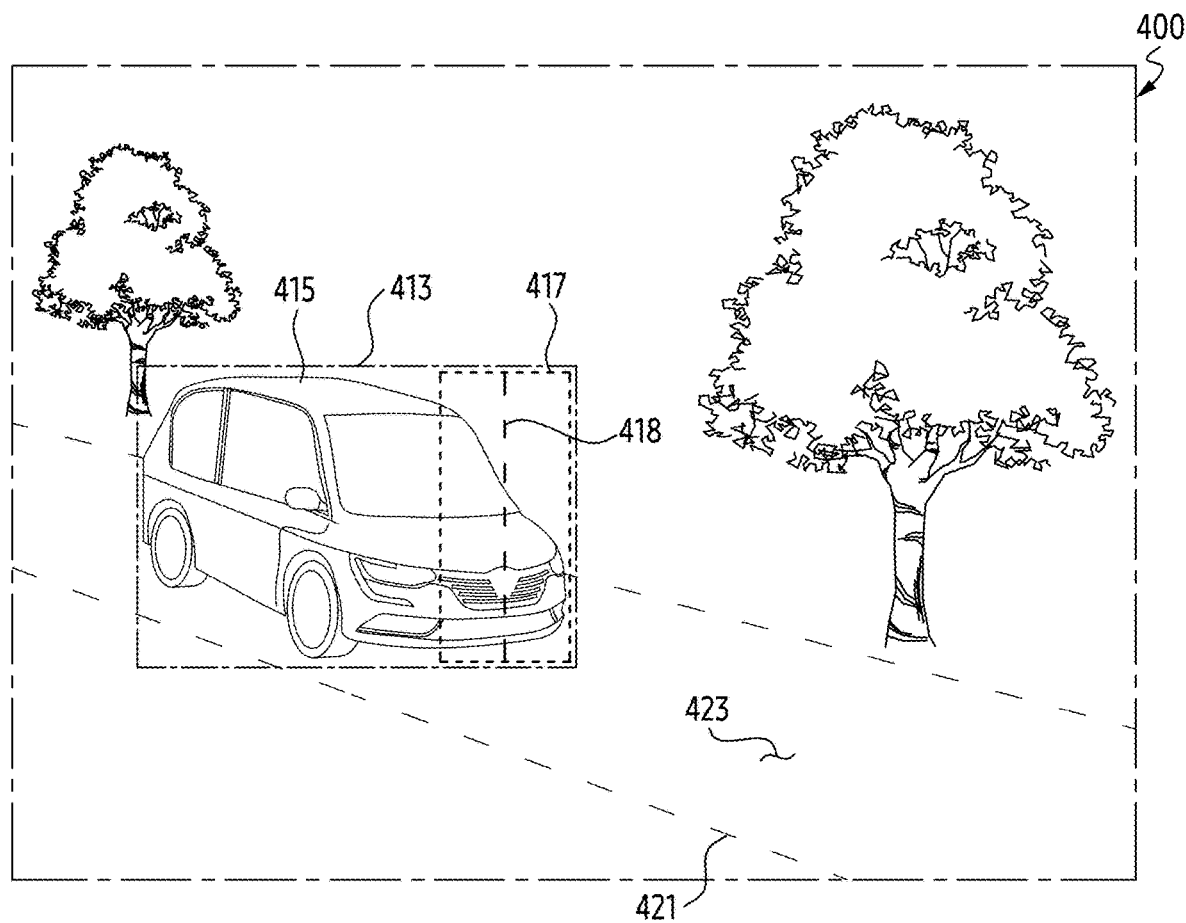
FIGS. 4A to 4B illustrate an example of frames including information on a subject that an electronic device obtained by using a second camera disposed on the left side surface of a vehicle, according to an embodiment.
Figure 4B:
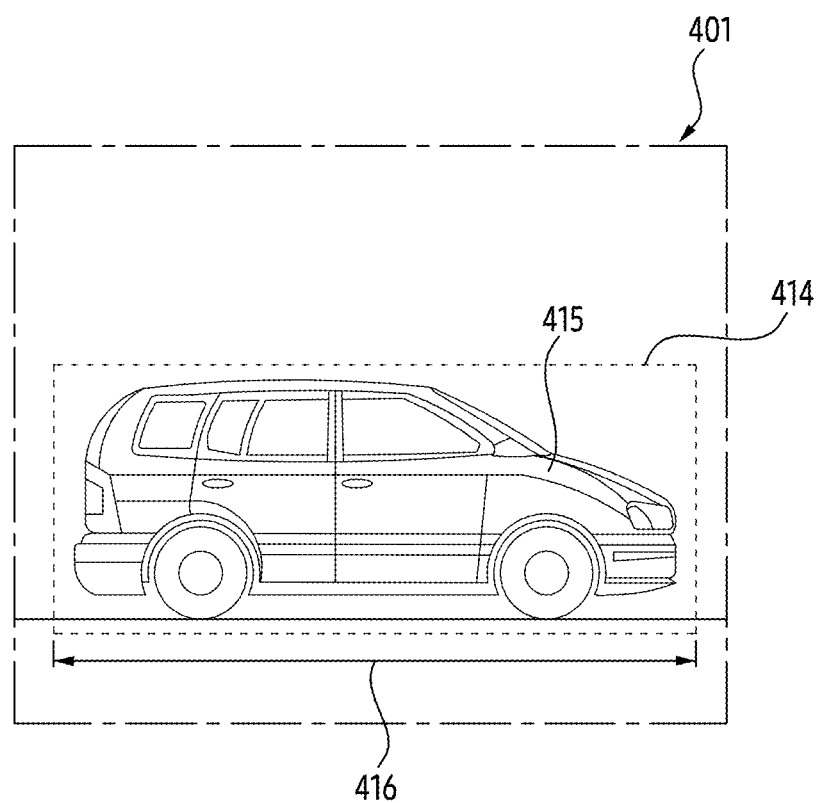

FIGS. 4A to 4B illustrate an example of frames including information on a subject that an electronic device obtained by using a second camera disposed on the left side surface of a vehicle, according to an embodiment.

Figure 5A:
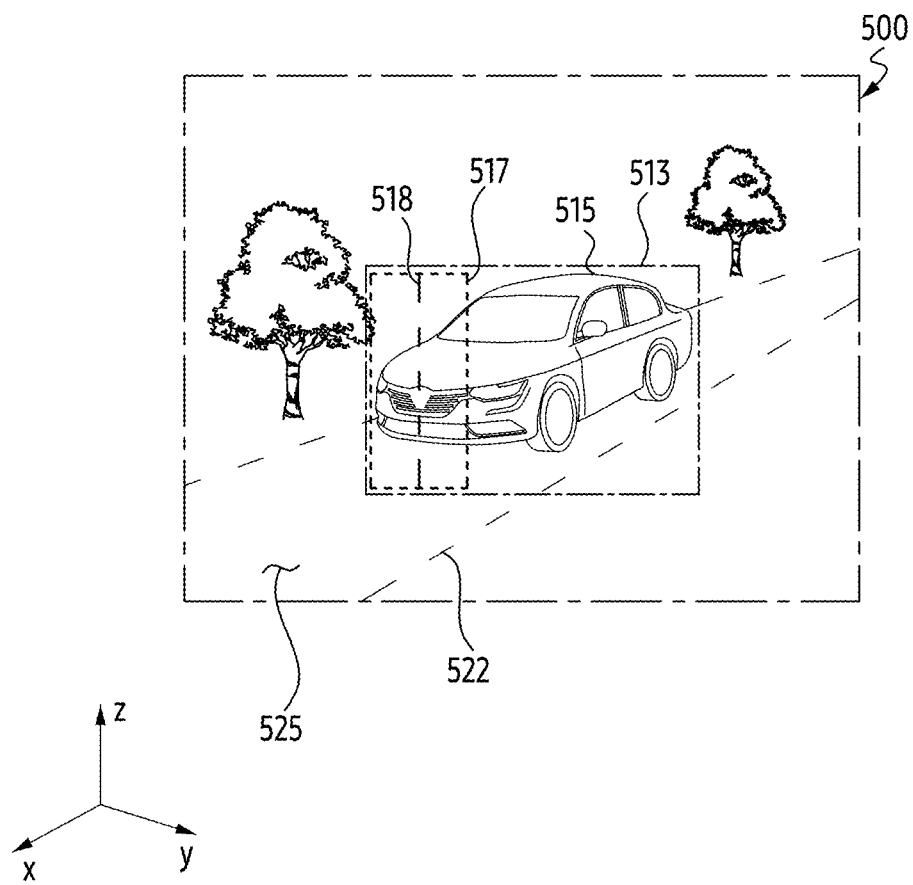
FIGS. 5A to 5B illustrate an example of frames including information on a subject that an electronic device obtained by using a third camera disposed on the right side surface of a vehicle, according to an embodiment.
Figure 5B:
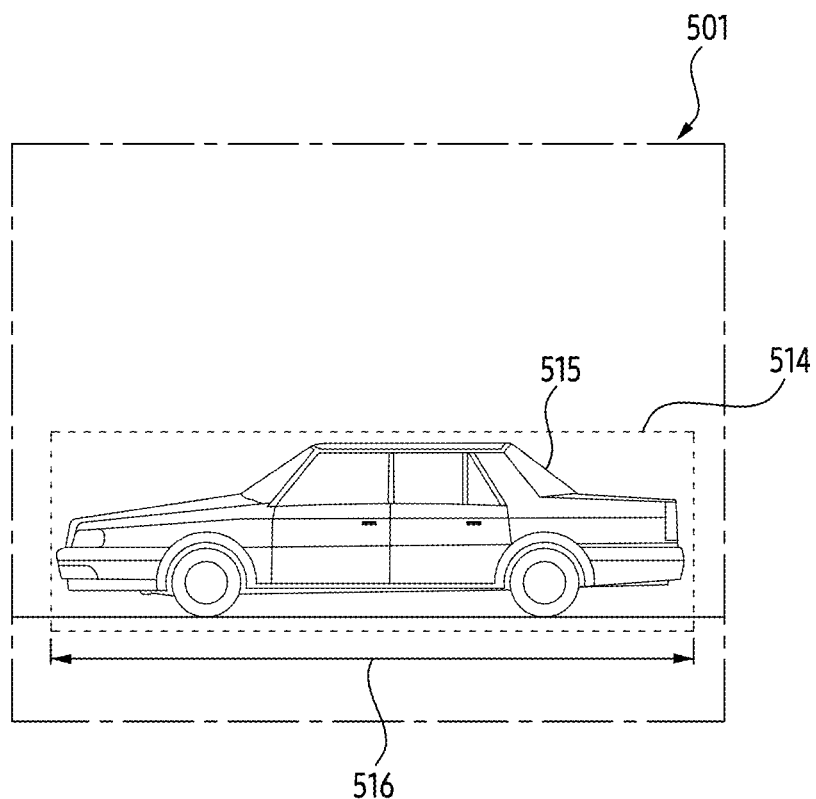

FIGS. 5A to 5B illustrate an example of frames including information on a subject that an electronic device obtained by using a third camera disposed on the right side surface of a vehicle, according to an embodiment. In FIGS. 4A to 5B, images 400 and 500 including one or more subjects located on the side of a vehicle (e.g., the vehicle 205 in FIG. 2A) in which the electronic device 101 in FIG. 1 is mounted are illustrated. For example, the images 400 and 500 may be included in a plurality of frames obtained by the electronic device 101 in FIG. 1 by using a part of the plurality of cameras. For example, the line 421 may be referred to the line 321 in FIG. 3. The lane 423 may be referred to the lane 323 in FIG. 3. The line 522 may be referred to the line 322 in FIG. 3. The lane 525 may be referred to the lane 325 in FIG. 3.

Referring to FIG. 4A, an image 400 according to an embodiment may be included in a plurality of frames (e.g., the second frames 220 in FIG. 2B) obtained by the electronic device 101 by using the second camera (e.g., the second camera 152 in FIG. 2A). For example, the electronic device 101 may obtain the captured image 400 toward the left direction (e.g., +y direction) of the vehicle (e.g., the vehicle 205 in FIG. 2A) by using the second camera (e.g., the second camera 152 in FIG. 2A). For example, the electronic device 101 may identify the vehicle 415, the line 421, and/or the lane 423 located on the left side of the vehicle (e.g., the vehicle 205 in FIG. 2A) in the image 400.

The electronic device 101 according to an embodiment may identify that the line 421 and/or the lane 423 are located on the left side surface of the vehicle (e.g., the vehicle 205 in FIG. 2A) by using the synchronized first camera (e.g., the first camera 151 in FIG. 2A) and second camera (e.g., the second camera 152 in FIG. 2A). The electronic device 101 may identify the extended line 421 from the line 321 in FIG. 3 toward one direction (e.g., −x direction) by using the first camera and/or the second camera.

Referring to FIG. 4A, the electronic device 101 according to an embodiment may identify the vehicle 415 located on the left side of the vehicle (e.g., the vehicle 205 in FIG. 2A) in which the electronic device 101 is mounted in the image 400. For example, the vehicle 415 included in the image 400 may be the vehicle 415 located at the rear left of the vehicle 205. The electronic device 101 may set an identifier for the vehicle 415 based on identifying the vehicle 415.

For example, the vehicle 415 may be an example of a vehicle moving toward the same direction (e.g., +x direction) as the vehicle (e.g., the vehicle 205 in FIG. 2A). For example, the electronic device 101 may identify the type of the vehicle 415 based on the exterior of the vehicle 415. For example, the electronic device 101 may obtain a parameter corresponding to the one or more subjects included in the image 400 through calibration of the image 400. Based on the obtained parameter, the electronic device 101 may identify the type of the vehicle 415. For example, the vehicle 415 may be an example of an SUV. For example, the electronic device 101 may obtain the width of the vehicle 415 based on the type of the bounding box 413 and/or the vehicle 415.

The electronic device 101 according to an embodiment may obtain the width of the vehicle 415 by using the bounding box 413. For example, the electronic device 101 may obtain the sliding window 417 having the same height as the height of the bounding box 413 and the width of at least a part of the width of the bounding box 413. The electronic device 101 may calculate, or sum the difference values of each of the pixels included in the bounding box 413 by shifting the sliding window in the bounding box 413. The electronic device 101 may identify the symmetry of the vehicle 415 included in the bounding box 413 by using the sliding window 417. For example, the electronic device 101 may obtain the central axis 418 within the bounding box 413 based on identifying whether each of the divided areas is symmetrical by using the sliding window 417. For example, the difference value of pixels included in each area, which is divided by the sliding window, based on the central axis 418, may correspond to 0. The electronic device 101 may identify the center of the front surface of the vehicle 415 by using the central axis 418. By using the center of the identified front surface, the electronic device 101 may obtain the width of the vehicle 415. Based on the obtained width, the electronic device 101 may identify a relative distance between the electronic device 101 and/or the vehicle 415. For example, the electronic device 101 may obtain a relative distance based on a ratio between the width of the vehicle 415 included in the data on the vehicle 415 (here, the data may be predetermined the width information and the length information depending on the type of vehicle) and the width of the vehicle 415 included in the image 400. However, it is not limited thereto.

For example, the electronic device 101 may identify a ratio between the width obtained by using the bounding box 413 and/or the sliding window 417. The electronic device 101 may obtain another image (e.g., the image 366 in FIG. 3B) by using the image 400 as at least one function. The electronic device 101 may obtain a line segment (e.g., the line segments 361-1, 362-1, 363-1, 364-1, and 365-1 in FIG. 3B) for indicating location information corresponding to the vehicle 415 based on the identified ratio. The electronic device 101 may obtain location information of the visual object of the vehicle 415 to be disposed in the images to be described later in FIGS. 8A to 8B by using the line segment.

Referring to FIG. 4B, the electronic device 101 according to an embodiment may identify the vehicle 415 located on the left side of the vehicle 205 included in the image 401 obtained by using the second camera 152 by using the bounding box 414. For example, the image 401 may be obtained after the image 400. The electronic device 101 may identify the vehicle 415 included in the image 401 by using an identifier set in the vehicle 415 included in the image 400.

For example, the electronic device 101 may obtain the length 416 of the vehicle 415 by using the bounding box 414. For example, the electronic device 101 may obtain a numerical value corresponding to the length 416 by using pixels corresponding to length 416 in the image 401. By using the obtained length 416, the electronic device 101 may identify a relative distance between the electronic device 101 and the vehicle 415. The electronic device 101 may store information indicating a relative distance in a memory. The information indicating the stored relative distance may be indicated as the object location information of Table 1. For example, the electronic device 101 may store the location information of the vehicle 415 and/or the type of the vehicle 415, and the like in a memory based on the location of the electronic device 101.

For example, the electronic device 101 may obtain another image (e.g., the image 366 in FIG. 3B) by inputting data corresponding to the image 401 into at least one function. For example, a part of the bounding box corresponding to the length 416 may be referred to the line segment 361-1, 362-1, 363-1, 364-1, and 365-1 in FIG. 3B. By using the other image, the electronic device 101 may obtain an image to be described later in FIGS. 8A to 8B.

Referring to FIG. 5A, an image 500 according to an embodiment may be included in a plurality of frames (e.g., the third frames 230 in FIG. 2B) obtained by the electronic device 101 by using the third camera (e.g., the third camera 153 in FIG. 2A). For example, the electronic device 101 may obtain the image 500 captured toward the right direction (e.g., −y direction) of the vehicle (e.g., the vehicle 205 in FIG. 2A) by using the third camera (e.g., the third camera 153 in FIG. 2A). For example, the electronic device 101 may identify the vehicle 515, the line 522, and/or the lane 525, which are disposed on the right side of the vehicle (e.g., the vehicle 205 in FIG. 2A), in the image 500.

The electronic device 101 according to an embodiment may identify that the line 522 and/or the lane 525 are disposed on the right side of the vehicle (e.g., the vehicle 205 in FIG. 2A) by using the synchronized first camera (e.g., the first camera 151 in FIG. 2A) and the third camera (e.g., the third camera 153 in FIG. 2A). The electronic device 101 may identify a line 522 extending toward one direction (e.g., −x direction) from the line 322 in FIG. 3 by using the first camera and/or the third camera.

The electronic device 101 according to an embodiment may identify a vehicle 515 disposed on the right side of the vehicle in which the electronic device 101 is mounted (e.g., the vehicle 205 in FIG. 2A) in the image 500. For example, the vehicle 515 may be an example of a vehicle moving toward the same direction (e.g., +x direction) as the vehicle (e.g., the vehicle 205 in FIG. 2A). For example, the electronic device 101 may identify the vehicle 515 located at the right rear of the vehicle 205 in FIG. 2A. For example, the electronic device 101 may set an identifier for the vehicle 515.

For example, the electronic device 101 may identify the type of the vehicle 515 based on the exterior of the vehicle 515. For example, the electronic device 101 may obtain a parameter corresponding to the one or more subjects included in the image 500 through calibration of the image 500. Based on the obtained parameter, the electronic device 101 may identify the type of the vehicle 515. For example, the vehicle 515 may be an example of a sedan.

For example, the electronic device 101 may obtain the width of the vehicle 515 based on the type of the bounding box 513 and/or the vehicle 515. For example, the electronic device 101 may identify a relative location relationship between the electronic device 101 and the vehicle 515 by using the length 516. For example, the electronic device 101 may identify the central axis 518 of the front surface of the vehicle 515 by using the sliding window 517. As described above with reference to FIG. 4A, the electronic device 101 may identify the central axis 518.

For example, the electronic device 101 may obtain the width of the vehicle 515 by using the identified central axis 518. Based on the obtained total width, the electronic device 101 may obtain a relative distance between the electronic device 101 and the vehicle 515. The electronic device 101 may identify location information of the vehicle 515 based on the obtained relative distance. For example, the location information of the vehicle 515 may comprise a coordinate value. The coordinate value may mean location information based on a 2-dimensional plane (e.g., xy plane). For example, the electronic device 101 may store location information of the vehicle 515 and/or the type of the vehicle 515, in a memory. Based on the ratio between the widths obtained by using the bounding box 513 and the sliding window 517, the operation of by the electronic device 101 obtaining line segments of an image different from the image 500 may be substantially similar to that described above with reference to FIG. 4A.

Referring to FIG. 5B, the electronic device 101 according to an embodiment may obtain an image 501. The image 501 may be one of the third frames 230 obtained by using a camera (e.g., the third camera 153 in FIG. 2B). For example, the image 501 may be obtained after the image 500.

The electronic device 101 according to an embodiment may identify the vehicle 515 located on the right side of the vehicle 205. The electronic device 101 may identify the vehicle 515 included in the image 500 and the vehicle 515 included in the image 501 as the same vehicle by using an identifier for the vehicle 515 included in the image 500.

For example, the electronic device 101 may identify the length 516 of the vehicle 515 by using the bounding box 514 in FIG. 5B. The electronic device 101 may obtain a numerical value of the length 516 by using pixels corresponding to the length 516 included in the image 501. By using the obtained length 516, the electronic device 101 may obtain a relative distance between the electronic device 101 and the vehicle 515. By using the obtained relative distance, the electronic device 101 may identify location information of the vehicle 515. The electronic device 101 may store the identified location information of the vehicle 515 in a memory. An operation in which the electronic device 101 obtains a line segment indicating the location of the vehicle 515 in a different image from the image 501 obtained by using at least one function by using the bounding box 514 may be substantially similar to the operation described above in FIG. 4B.

The electronic device may identify the one or more subjects (e.g., the vehicles 415, 515 and the lines 421, 522) located in the side direction of the vehicle (e.g., the vehicle 205 in FIG. 2A) on which the electronic device 101 is disposed (e.g., the left direction, or the right direction) by using the second camera (e.g., the second camera 152 in FIG. 2A) synchronized with the first camera (e.g., the first camera 151 in FIG. 2A) and/or the third camera (e.g., the third camera 153 in FIG. 2A). For example, the electronic device 101 may obtain information on the type or size of the vehicles 415 and 515 by using at least one data stored in the memory. For example, based on the location of the electronic device 101, the electronic device 101 may obtain relative location information of the vehicles 415 and 515 disposed in a space adjacent to the vehicle (e.g., the vehicle 205 in FIG. 2A) on which the electronic device 101 is disposed. The electronic device 101 may obtain a relative distance between the electronic device 101 and the vehicles 415, 515 by using the width and/or the length of the vehicles 415, 515 obtained by using the images 400, 401, 500, and 501. The electronic device 101 may obtain location information of the vehicles 415 and 515 by using the relative distance. The location information may comprise a coordinate value based on one plane (e.g., x-y plane). The electronic device 101 may store information on the type or size of the vehicles 415 and 515 and/or the location information in a memory (e.g., the memory 130 in FIG. 1) in a log file. The electronic device 101 may receive a user input indicating that among a plurality of frames stored in the log file, vehicles 415 and 515 select one frame corresponding to the captured timing. The electronic device 101 may display a plurality of frames including the one frame in the display of the electronic device 101 (e.g., the display 190 in FIG. 1) based on the received input. Based on displaying the plurality of frames in the display, the electronic device 101 may provide the user with the type of vehicles 415 and 515 and/or the location information of the vehicles 415 and 515 disposed in the adjacent space of the vehicle (e.g., the vehicle 205 in FIG. 2A) on which the electronic device 101 is mounted.

Figure 6:
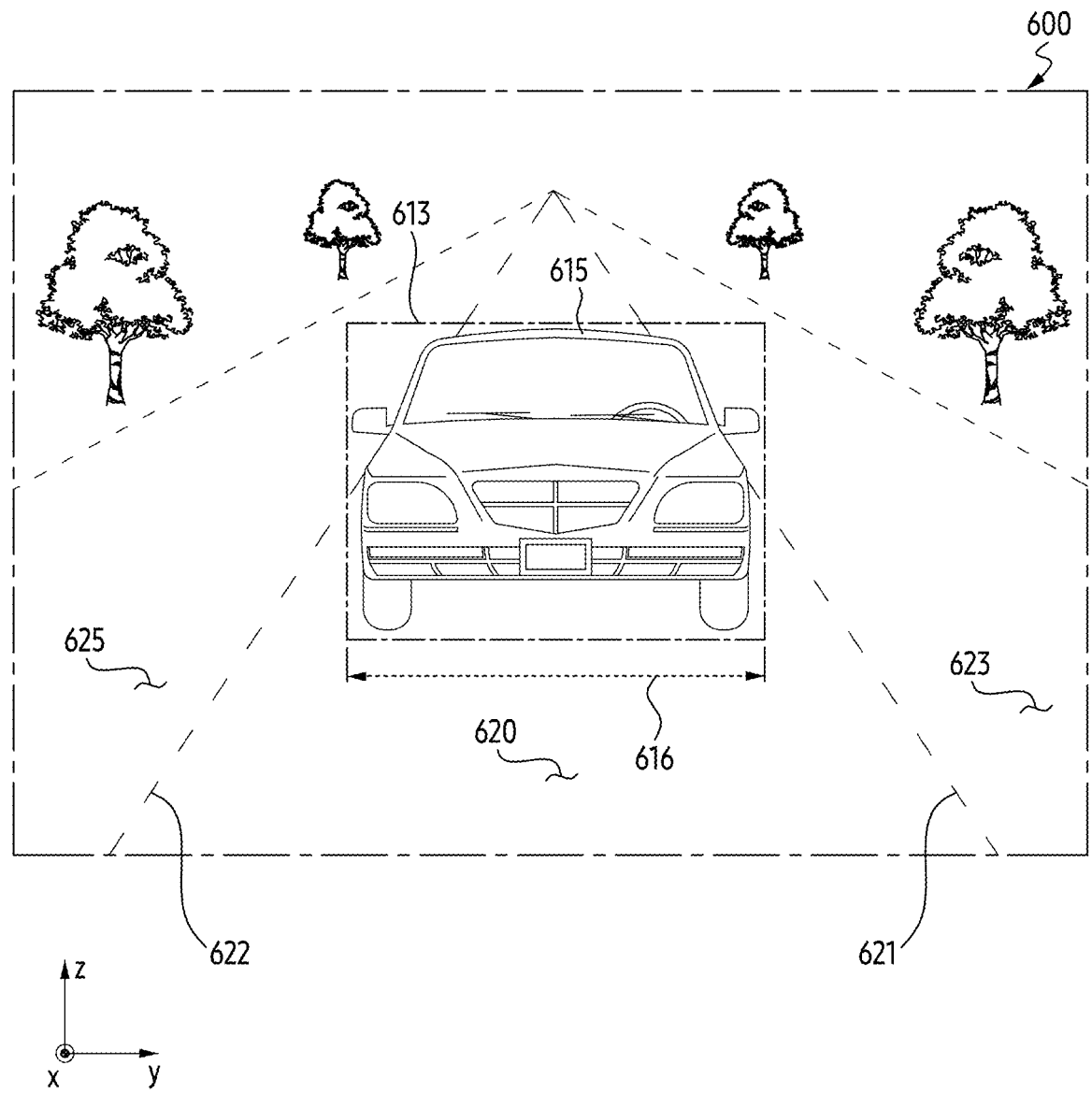
FIG. 6 illustrates an example of frames including information on a subject that an electronic device obtained by using a fourth camera disposed at the rear of a vehicle, according to an embodiment.

FIG. 6 illustrates an example of frames including information on a subject that an electronic device obtained by using a fourth camera disposed at the rear of a vehicle, according to an embodiment. Referring to FIG. 6, the image 600 corresponding to one frame among the fourth frames (e.g., the fourth frames 240 in FIG. 2B) obtained by the fourth camera (e.g., the fourth camera 154 in FIG. 2A) in which the electronic device 101 in FIG. 1 is disposed toward a direction (e.g., −x direction) different from the moving direction of the vehicle is illustrated. For example, the line 621 may be referred to the line 321 in FIG. 3. The line 622 may be referred to the line 322 in FIG. 3. The lane 620 may be referred to the lane 320 in FIG. 3. The lane 623 may be referred to the lane 323 in FIG. 3.

The image 600 according to an embodiment may comprise the one or more subjects disposed at the rear of a vehicle (e.g., the vehicle 205 in FIG. 2A) on which the electronic device 101 is mounted. For example, the electronic device 101 may identify the vehicle 615, the lanes 620, 623, and 625 and/or the lines 621, 622 in the image 600.

The electronic device 101 according to an embodiment may identify the lines 621, 622 using a first camera (e.g., the first camera 151 in FIG. 1) and a fourth camera (e.g., the fourth camera 154 in FIG. 1) synchronized with the first camera. The electronic device may identify the lines 621, 622 extending toward a direction (e.g., −x direction) opposite to the moving direction of the vehicle (e.g., the vehicle 205 in FIG. 2A), from the lines 321 and 322 in FIG. 3 disposed within the frames obtained by the first camera (e.g., the first camera 151 in FIG. 1). For example, the electronic device 101 may identify the lane 620 divided by the lines 621 and 622.

The electronic device 101 may identify the vehicle 615 disposed on the lane 620 by using the bounding box 613. For example, the electronic device 101 may identify the type of the vehicle 615 based on the exterior of the vehicle 615. For example, the electronic device 101 may identify the type and/or size of the vehicle 615 within the image 600, based on radiator grille, shape of bonnet, shape of headlight, emblem and/or wind shield included in the front of the vehicle 615.

For example, the electronic device 101 may identify the width 616 of the vehicle 615 by using the bounding box 613. The width 616 of the vehicle 615 may correspond to one line segment of the bounding box 613. For example, the electronic device 101 may obtain the width 616 of the vehicle 615 based on identifying the type (e.g., sedan) of the vehicle 615. For example, the electronic device 101 may obtain the width 616 by using a size representing the type (e.g., sedan) of the vehicle 615.

The electronic device 101 according to an embodiment may obtain location information of the vehicle 615 with respect to the electronic device 101 based on identifying the type and/or size (e.g., the width 616) of the vehicle 615. An operation by which the electronic device 101 obtains the location information by using the width and/or the length of the vehicle 615 may be similar to the operation performed by the electronic device 101 in FIGS. 4A to 5B. Hereinafter, a detailed description will be omitted.

The electronic device 101 according to an embodiment identifies an overlapping area in obtained frames (e.g., the frames 210, 220, 230, and 240 in FIG. 2B) based on the angles of view 206, 207, 208, and 209 in FIG. 2A. The electronic device 101 may identify an object (or subject) based on the same identifier in an overlapping area. For example, the electronic device 101 may identify an object (not illustrated) based on a first identifier in the fourth frames 240 obtained by using the fourth camera 154 in FIG. 2A. The electronic device 101 may identify first location information on the object included in the fourth frames. While identifying the object in the fourth frames 240 in FIG. 2A, the electronic device 101 may identify the object based on the first identifier in frames (e.g., the second frames 220 in FIG. 2A or the third frame 230 in FIG. 2A) obtained by using the second camera 152 in FIG. 2A and/or the third camera 153 in FIG. 2A. The electronic device 101 may identify second location information on the object. For example, the electronic device 101 may merge the first location information and the second location information on the object based on the first identifier and store them in a memory. For example, the electronic device 101 may store one of the first location information and the second location information in a memory. However, it is not limited thereto.

As described above, the electronic device 101 according to an embodiment may obtain information (e.g., type of vehicle and/or location information of vehicle) about the one or more subjects from a plurality of obtained frames (e.g., the first frames 210, the second frames 220, the third frames 230, and the fourth frames 240 in FIG. 2B) by using a plurality of cameras (e.g., the plurality of cameras 150 in FIG. 1) synchronized with each other. For example, the electronic device 101 may store the obtained information in a log file. The electronic device 101 may generate an image corresponding to the plurality of frames by using the log file. The image may comprise information on subjects included in each of the plurality of frames. The electronic device 101 may display the image through a display (e.g., the display 190 in FIG. 1). For example, the electronic device 101 may store data about the generated image in a memory. The description of the image generated by the electronic device 101 will be described later in FIGS. 8A to 8B.

Figure 7:
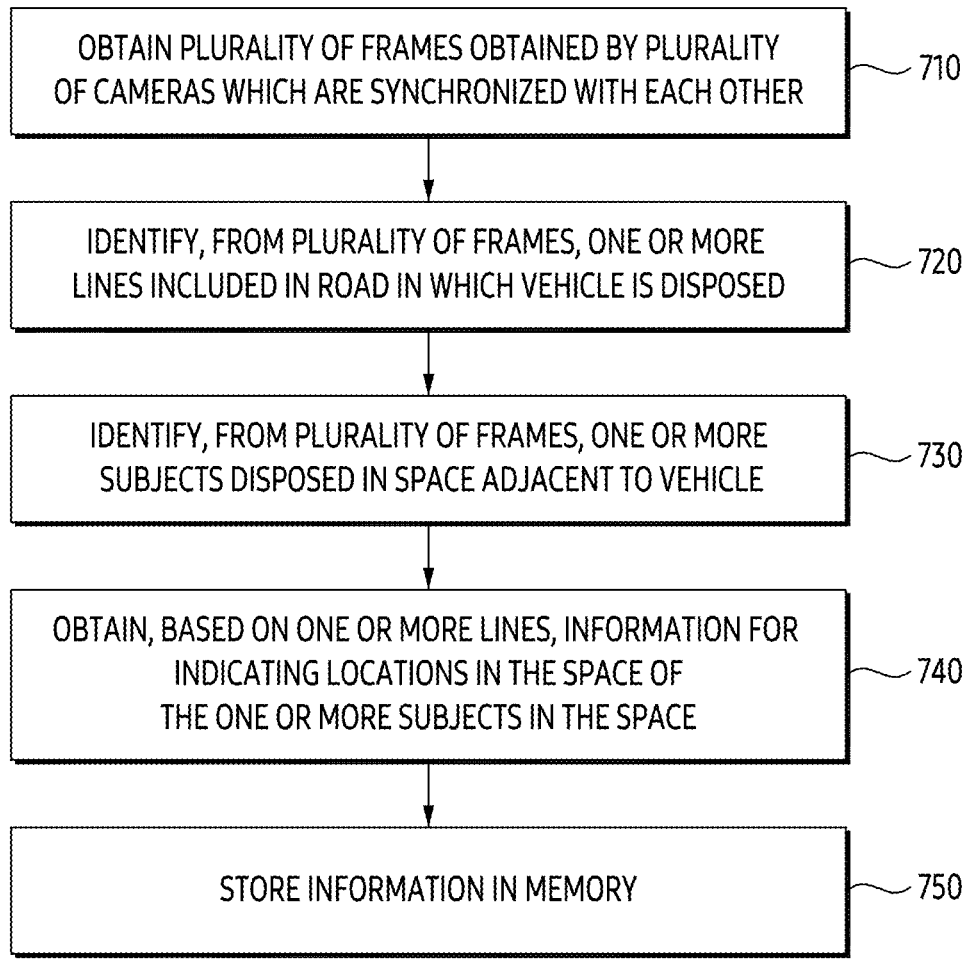
FIG. 7 is an exemplary flowchart illustrating an operation in which an electronic device obtains information on one or more subjects included in a plurality of frames obtained by using a plurality of cameras, according to an embodiment.

FIG. 7 is an exemplary flowchart illustrating an operation in which an electronic device obtains information on one or more subjects included in a plurality of frames obtained by using a plurality of cameras, according to an embodiment. At least one operation of the operations in FIG. 7 may be performed by the electronic device 101 in FIG. 1 and/or the processor 120 of the electronic device 101 in FIG. 1.

Referring to FIG. 7, in operation 710, the processor 120 according to an embodiment may obtain a plurality of frames obtained by the plurality of cameras synchronized with each other. For example, the plurality of cameras synchronized with each other may comprise the first camera 151 in FIG. 1, the second camera 152 in FIG. 1, the third camera 153 in FIG. 1, and/or the fourth camera 154 in FIG. 1. For example, each of the plurality of cameras may be disposed in different parts of a vehicle (e.g., the vehicle 205 in FIG. 2A) on which the electronic device 101 is mounted. For example, the plurality of cameras may establish a connection by wire by using a cable included in the vehicle. For example, the plurality of cameras may establish a connection by wireless through a communication circuit (e.g., the communication circuit 170 in FIG. 1) of an electronic device. The processor 120 of the electronic device 101 may synchronize the plurality of cameras based on the established connection. For example, the plurality of frames obtained by the plurality of cameras may comprise the first frames 210 in FIG. 2B, the second frames 220 in FIG. 2B, the third frames 230 in FIG. 2B, and/or the fourth frames 240 in FIG. 2B. The plurality of frames may mean a sequence of images captured according to a designated frame rate by the plurality of cameras while the vehicle on which the electronic device 101 is mounted is in operation. For example, the plurality of frames may comprise the same time information.

Referring to FIG. 7, in operation 720, the processor 120 according to an embodiment may identify one or more lines included in the road where the vehicle is located from a plurality of frames. For example, the vehicle may be referred to the vehicle 205 in FIG. 2A. The road may comprise lanes 320, 323, and 325 in FIG. 3A. The lines may be referred to the lines 321 and 322 in FIG. 3A. For example, the processor may identify lanes by using a pre-trained neural network stored in a memory (e.g., the memory 130 in FIG. 1).

Referring to FIG. 7, in operation 730, the processor according to an embodiment may identify the one or more subjects disposed within a space adjacent to the vehicle from a plurality of frames. For example, the space adjacent to the vehicle may comprise the road. For example, the one or more subjects may comprise the vehicle 315 in FIG. 3, the vehicle 415 in FIG. 4B, the vehicle 515 in FIG. 5B, and/or the vehicle 615 in FIG. 6. The processor may obtain information on the type and/or size of the one or more identified subjects using a neural network different from the neural network.

Referring to FIG. 7, in operation 740, the processor 120 according to an embodiment may obtain information for indicating locations of the one or more subjects in a space based on one or more lines. For example, the processor 120 may identify a distance for each of the one or more subjects based on a location where each of the plurality of cameras is disposed in the vehicle (e.g., the vehicle 205 in FIG. 2A), the magnification of each of the plurality of cameras, the angle of view of each of the plurality of cameras, the type of each of the one or more subjects, and/or, the Size of each of the one or more subjects. The processor 120 may obtain location information for each of the one or more subjects by using coordinate values based on the identified distance.

Referring to FIG. 7, in operation 750, the processor 120 according to an embodiment may store information in a memory. For example, the information may comprise the type of the one or more subjects included in a plurality of frames obtained by the processor 120 using the plurality of cameras (e.g., the plurality of cameras 150 in FIG. 1) and/or location information of the one or more subjects. The processor may store the information in a memory (e.g., the memory 130 in FIG. 1) in a log file. For example, the processor 120 may store the timing at which the one or more subjects are captured. For example, in response to an input indicating that the timing is selected, the processor 120 may display a plurality of frames corresponding to the timing within the display (e.g., the display 190 in FIG. 1). The processor 120 may provide information on the one or more subjects included in the plurality of frames to the user, based on displaying the plurality of frames within the display.

As described above, the electronic device 101 and/or the processor 120 of the electronic device may identify the one or more subjects (e.g., the vehicle 315 in FIG. 3A, the vehicle 415 in FIG. 4B, the vehicle 515 in FIG. 5B, and/or vehicle 615 in FIG. 6) included in each of a plurality of obtained frames by using the plurality of cameras 150. The electronic device 101 and/or the processor 120 may obtain information on the type and/or size of each of the one or more subjects based on the exterior of the identified the one or more subjects. The electronic device 101 and/or the processor 120 may obtain a distance from the electronic device 101 for each of the one or more subjects based on identifying a line and/or a lane included in each of the plurality of frames. The electronic device 101 and/or the processor 120 may obtain location information for each of the one or more subjects based on information on the obtained distance, the type and/or size of each of the one or more subjects. The electronic device 101 and/or the processor 120 may store the obtained plurality of information in a log file of a memory. The electronic device 101 and/or the processor 120 may generate an image including the plurality of information by using the log file. The electronic device 101 and/or the processor 120 may provide the generated image to the user. The electronic device 101 and/or the processor 120 may provide the user with information on the one or more subjects by providing the image. Hereinafter, an operation in which the electronic device provides the image will be described later in FIGS. 8A to 8B.

Figure 8A:
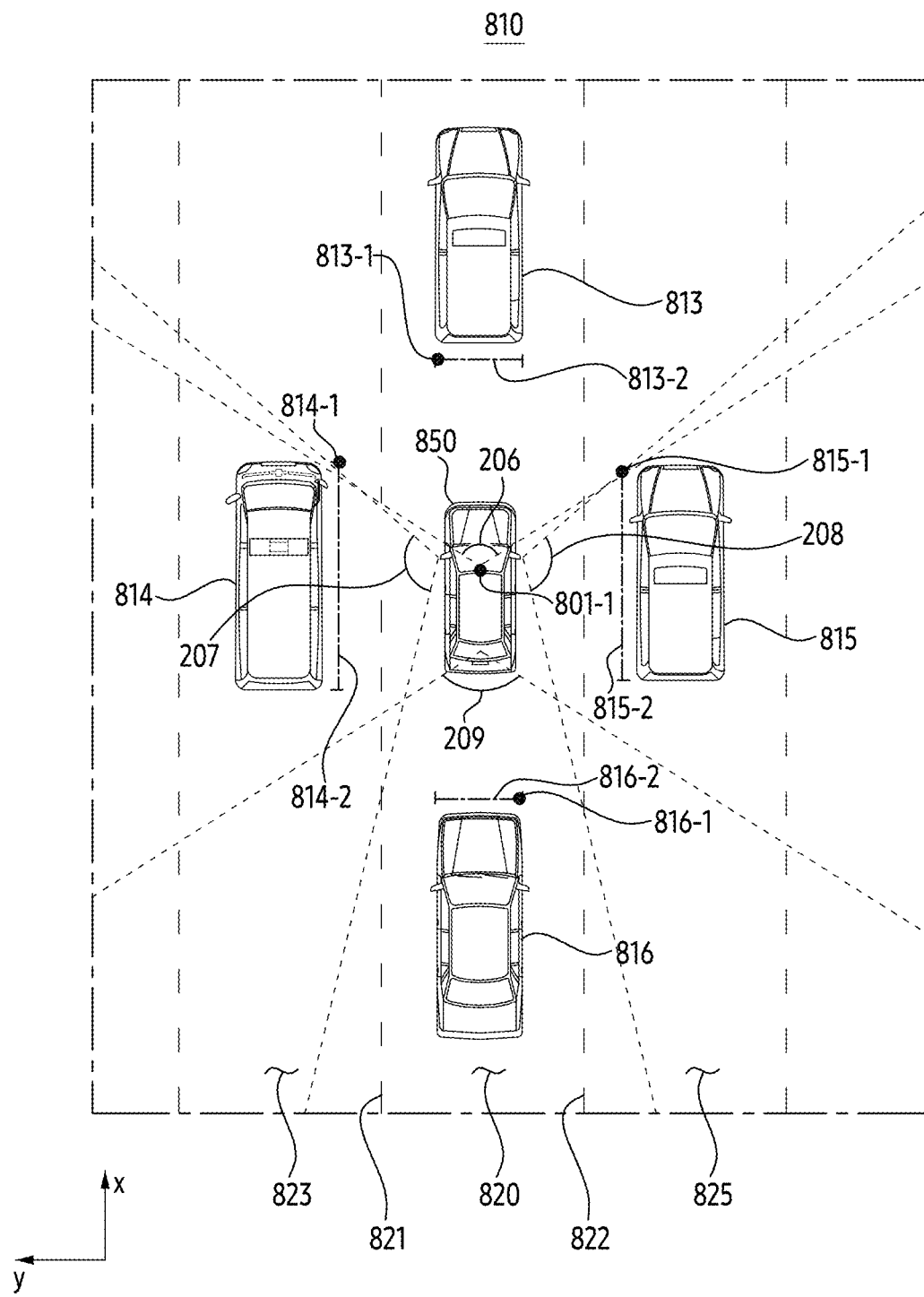
FIGS. 8A and 8B illustrate an exemplary screen including one or more subjects, which is generated by an electronic device based on a plurality of frames obtained by using a plurality of cameras, according to an embodiment.
Figure 8B:
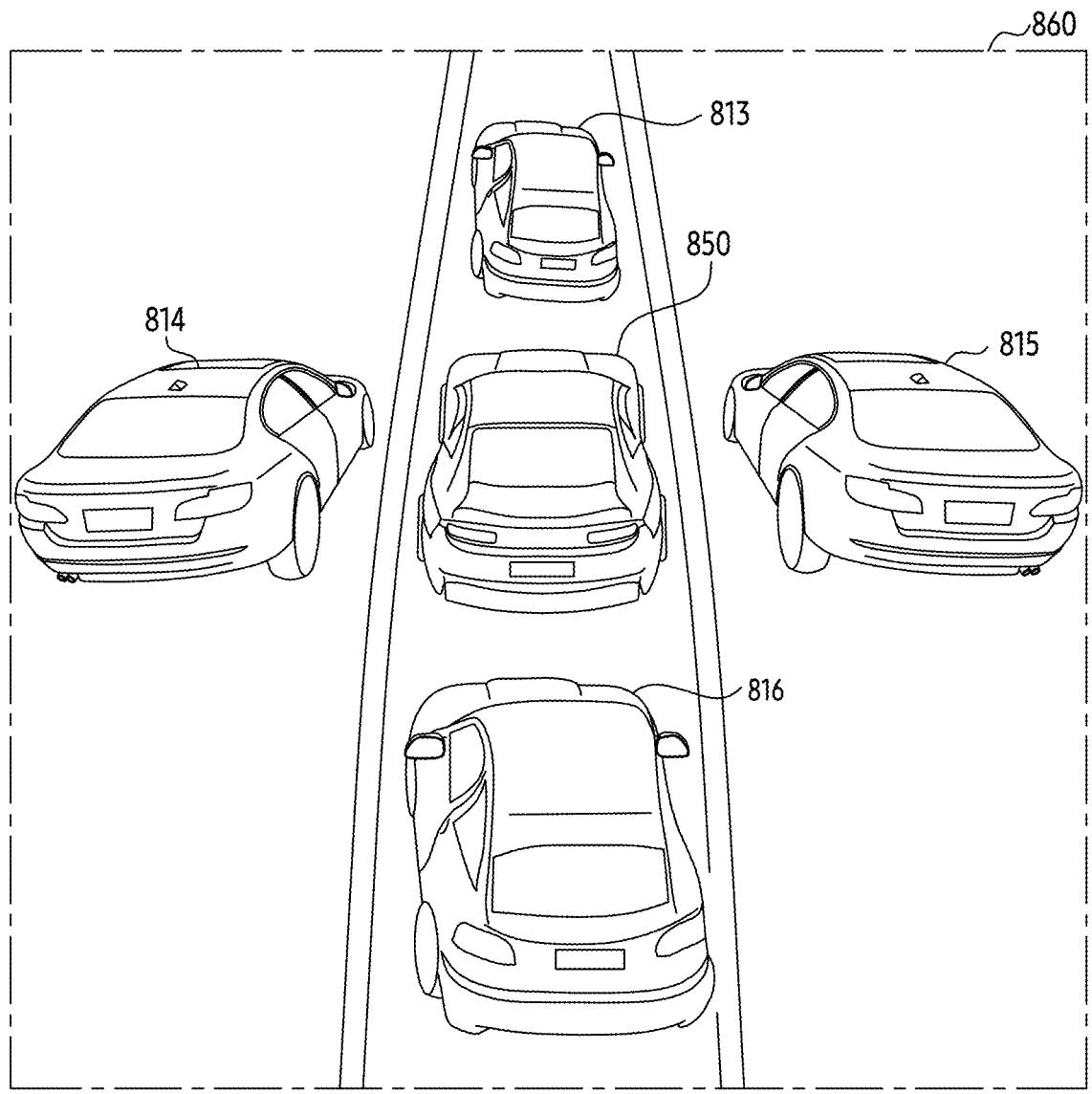

FIGS. 8A and 8B illustrate an exemplary screen including one or more subjects, which is generated by an electronic device based on a plurality of frames obtained by using a plurality of cameras, according to an embodiment. The electronic device 101 in FIGS. 8A to 8B may be referred to the electronic device 101 in FIG. 1.

Referring to FIG. 8A, the image 810 may comprise the visual object 850 corresponding to a vehicle (e.g., the vehicle 205 in FIG. 2A) on which the electronic device 101 in FIG. 1 is mounted based on two axes (e.g., x-axis, and y-axis). The image 810 may comprise a plurality of visual objects 813, 814, 815, and 816 corresponding to each of the one or more subjects disposed within an adjacent space of the vehicle. The image 810 may comprise the visual objects 821 and 822 corresponding to lines (e.g., the lines 321 and 322 in FIG. 3) and/or the visual objects 820, 823, and 825 corresponding to lanes (e.g., the lanes 320, 323, and 325 in FIG. 3) disposed within an adjacent space of the vehicle. For example, the image 810 may comprise the plurality of visual objects moving toward one direction (e.g., x direction). For example, the electronic device 101 in FIG. 1 may generate an image 810 based on a log file stored in a memory (e.g., the memory 130 in FIG. 1).

According to an embodiment, the log file may comprise information on an event that occurs while the operating system or other software of the electronic device 101 is executed. For example, the log file may comprise information (e.g., type, number, and/or location) about the one or more subjects included in the frames obtained through the plurality of cameras (e.g., the plurality of cameras 150 in FIG. 1). The log file may comprise time information in which the one or more subjects are included in each of the frames. For example, the electronic device 101 may store the log file in memory by logging the information on the one or more subjects and/or the time information. The log file may be indicated as shown in Table 1 described above.

The electronic device 101 according to an embodiment may obtain an image 810 by using a plurality of frames obtained by a plurality of included cameras (e.g., the plurality of cameras 150 in FIG. 1). For example, the image 810 may comprise the plurality of visual objects 850, 813, 814, 815, and 816 on a plane configured based on two axes (x-axis and y-axis). For example, the image 810 may be an example of an image (e.g., top view, or bird's eye view) viewed toward a plane (e.g., xy plane). For example, based on around view monitoring (AVM) stored in the electronic device 101, the image 810 may be obtained by using a plurality of frames.

The electronic device 101 according to an embodiment may generate an image 810 by using a plurality of frames obtained by the plurality of cameras facing in different directions. For example, the electronic device 101 may obtain an image 810 by using at least one neural network based on lines included in a plurality of frames (e.g., the first frame 210, the second frame 220, the third frame 230, and/or the fourth frame 240 in FIG. 2A). For example, the line 821 may correspond to the line 321 in FIG. 3. The line 822 may correspond to the line 322 in FIG. 3. The lanes 820, 823, and 825 divided by the lines 821 and 822 may correspond to the lanes 320, 323, and 325 in FIG. 3, respectively.

The electronic device 101 according to an embodiment may dispose the visual objects 813, 814, 815, and 816 in the image 810 by using location information and/or type for the one or more subjects (e.g., the vehicle 315 in FIG. 3, the vehicle 415 in FIG. 4B, the vehicle 515 in FIG. 5B, and the vehicle 615 in FIG. 6) included in each of the plurality of frames.

For example, the electronic device 101 may identify information on vehicles (e.g., the vehicle 315 in FIG. 3, the vehicle 415 in FIGS. 4A and 4B, vehicle 515 in FIGS. 5A and 5B, vehicle 615 in FIG. 6) corresponding to each of the visual objects 813, 814, 815, and 816 by using a log file stored in the memory. The information may comprise type, size, and/or location information of the vehicles. For example, the electronic device 101 may adjust the location where the visual objects 813, 814, 815, and 816 are disposed in the visual object 850 corresponding to the vehicle (e.g., the vehicle 205 in FIG. 2A) on which the electronic device 101 is mounted, based on the point 801-1. For example, the point 801-1 may correspond to the location of the electronic device 101 mounted on the vehicle 205 in FIG. 2B. The point 801-1 may mean a reference location (e.g., (0,0) in xy plane) for disposing the visual objects 813, 814, 815, and 816.

For example, the visual object 813 may correspond to a vehicle (e.g., the vehicle 315 in FIG. 3) located within the angle of view 206 of the first camera (e.g., the first camera 151 in FIG. 2A). For example, the line segment 813-2 may be obtained by using one edge (e.g., the width of the bounding box) of the bounding box 313 in FIG. 3. For example, the line segment 813-2 may be referred to one of the line segments in FIG. 3B. For example, the electronic device 101 may dispose the visual object 813 by using the location information of the vehicle (e.g., the vehicle 315 in FIG. 3A) corresponding to the visual object 713 based on the point 813-1 of the line segment 813-2. For example, the electronic device 101 may obtain a distance from the point 810-1 to the point 813-1 by using the location information of the vehicle. The electronic device 101 may obtain the distance based on a designated ratio to the location information of the vehicle. However, it is not limited thereto.

The visual object 814 may correspond to a vehicle (e.g., the vehicle 415 in FIG. 4B) located within the angle of view 207 of the second camera (e.g., the second camera 152 in FIG. 2A). The line segment 814-2 may correspond to one edge of the bounding box 413 in FIG. 4B. The line segment 814-2 may be referred to the length 416 in FIG. 4B. The electronic device 101 may dispose the visual object 814 by using the location information on the vehicle (e.g., the vehicle 415 in FIG. 4B) based on the one point 814-1 of the line segment 814-2. However, it is not limited thereto.

For example, the visual object 815 may correspond to a vehicle (e.g., the vehicle 515 in FIG. 5B) located within the angle of view 208 of the third camera (e.g., the third camera 153 in FIG. 2A). The line segment 815-2 may be obtained by using one edge of the bounding box 513 in FIG. 5B. The line segment 815-2 may be referred to the length 516 in FIG. 5B. The electronic device 101 may dispose the visual object 815 by using the location information on the vehicle (e.g., the vehicle 515 in FIG. 5B) based on the one point 815-1 of the line segment 815-2. However, it is not limited thereto.

For example, the visual object 816 may correspond to a vehicle (e.g., the vehicle 615 in FIG. 6) located within the angle of view 209 of the fourth camera (e.g., the fourth camera 154 in FIG. 2A). The line segment 816-2 may be obtained by using the bounding box 613 in FIG. 6. The line segment 816-2 may be referred to the width 616 in FIG. 6. The electronic device 101 may dispose the visual object 816 by using the location information on the vehicle (e.g., the vehicle 615 in FIG. 6), based on the point 816-1 of the line segment 816-2.

For example, the electronic device 101 may identify information on the points 813-1, 814-1, 815-1, and 816-1 based on the point 801-1 based on the designated ratio from the location information of the one or more subjects obtained by using a plurality of frames (e.g., the frames 210, 220, 230, and 240 in FIG. 2B). The electronic device 101 may indicate the points as coordinate values based on two axes (e.g., x-axis and y-axis).

The electronic device 101 according to an embodiment may identify information on a subject (e.g., the vehicle 315) included in an image (e.g., the image 310 in FIG. 3A) corresponding to one frame among the first frames (e.g., the first frames 210 in FIG. 2) obtained by using a first camera (e.g., the first camera 151 in FIG. 1). The information may comprise type, size, and/or location information of the subject (e.g., the vehicle 315). For example, based on the identified information, the electronic device 101 may identify the visual object 813. For example, the electronic device 101 may dispose the visual object 813 in front of the visual object 850 corresponding to a vehicle (e.g., the vehicle 205 in FIG. 2A) based on the identified information. For example, the visual object 813 may be disposed from the visual object 850 toward a moving direction (e.g., x direction).

The electronic device 101 according to an embodiment may identify information on a subject (e.g., the vehicle 415) included in an image (e.g., the image 400 in FIG. 4A) corresponding to one frame among the second frames (e.g., the second frames 220 in FIG. 2) obtained by using a second camera (e.g., the first camera 152 in FIG. 1). The information may comprise type, size, and/or location information of the subject (e.g., the vehicle 415). For example, based on the identified information, the electronic device 101 may identify the visual object 814. For example, the electronic device 101 may dispose the visual object 814 on the left side of the visual object 850 corresponding to the vehicle (e.g., the vehicle 205 in FIG. 2A) based on the identified information. For example, the electronic device 101 may dispose the visual object 814 on the lane 823.

The electronic device 101 according to an embodiment may identify information on a subject (e.g., the vehicle 515) included in an image (e.g., the image 500 in FIG. 5) corresponding to one frame among the third frames (e.g., the third frames 230 in FIG. 2) obtained by using the third camera (e.g., the third camera 153 in FIG. 1). The information may comprise type, size, and/or location information of the subject (e.g., the vehicle 515). For example, based on the identified information, the electronic device 101 may identify the visual object 815. For example, the electronic device 101 may dispose the visual object 815 on the right side of the visual object 850 corresponding to the vehicle (e.g., the vehicle 205 in FIG. 2A) based on the identified information. For example, the electronic device 101 may dispose the visual object 815 on the lane 825.

The electronic device 101 according to an embodiment may identify information on a subject (e.g., the vehicle 615) included in an image (e.g., the image 600 in FIG. 6) corresponding to one frame among the fourth frames (e.g., the fourth frames 240 in FIG. 2) obtained by using the fourth camera (e.g., the fourth camera 154 in FIG. 1). The information may comprise type, size, and/or location information of the subject (e.g., vehicle 615). For example, based on the identified information, the electronic device 101 may identify the visual object 816. For example, the electronic device 101 may dispose the visual object 816 at the rear of the visual object 850 corresponding to the vehicle (e.g., the vehicle 205 in FIG. 2A), based on the identified information. For example, the electronic device 101 may dispose the visual object 816 on the lane 820.

The electronic device 101 according to an embodiment may provide a location relationship for vehicles (e.g., the vehicle 205 in FIG. 2A, the vehicle 315 in FIG. 3A, the vehicle 415 in FIG. 4A, the vehicle 515 in FIG. 5A, and the vehicle 615 in FIG. 6) corresponding to the visual objects 850, 813, 814, 815, and 816 based on the image 810. For example, based on the time information included in the log file, the electronic device 101 may indicate the movement of visual objects 850, 813, 814, 815, and 816 corresponding to each of the vehicles during the time indicated in the time information, by using the image 810. The electronic device 101 may identify contact between a part of the vehicles based on the image 810.

Referring to FIG. 8B, the image 860 in which the electronic device 101 according to an embodiment reconstructs frames corresponding to the time information by using the time information included in the log file is illustrated. The image 860 may be referred to a top view image or a bird eye view image. The electronic device 101 may obtain the image 860 based on 3-dimensions by using a plurality of frames. For example, the image 860 may be referred to the image 810. The electronic device 101 according to an embodiment may playback the image 860 based on a designated time by controlling the display. The image 860 may comprise visual objects 813, 814, 815, 816, and 850. For example, the electronic device 101 may generate the image 860 by using a plurality of frames obtained by using the plurality of cameras 150 in FIG. 1 for a designated time. For example, the designated time may comprise a time point when a collision between a vehicle (e.g., the vehicle 205 in FIG. 2A) on which the electronic device 101 is mounted and another vehicle (e.g., the vehicle 615 in FIG. 6) occurs. The electronic device 101 may provide the surrounding environment of the vehicle (e.g., the vehicle 205 in FIG. 2A) on which the electronic device 101 is mounted to the user by using the image 810 and/or the image 860.

As described above, the electronic device 101 may obtain information on the one or more subjects (or vehicles) included in a plurality of frames (e.g., the frames 210, 220, 230, and 240 in FIG. 2) obtained by the plurality of cameras (e.g., the plurality of cameras 150 in FIG. 1). For example, the information may comprise the type, size, location of the one or more subjects (e.g., vehicles) and/or timing (time) at which the one or more subjects were captured. For example, the electronic device 101 may obtain the image 810 by using the plurality of frames based on the information. For example, the timing may comprise a time point at which contact between a part of the one or more subjects occurs.

In response to an input indicating the selection of a frame corresponding to the time point, the electronic device 101 may provide the image 810 and/or the image 860 corresponding to the frame to the user. The electronic device 101 may reconstruct contact (or interaction) between a part of the one or more subjects by using the image 810 and/or the image 860.

Figure 9:
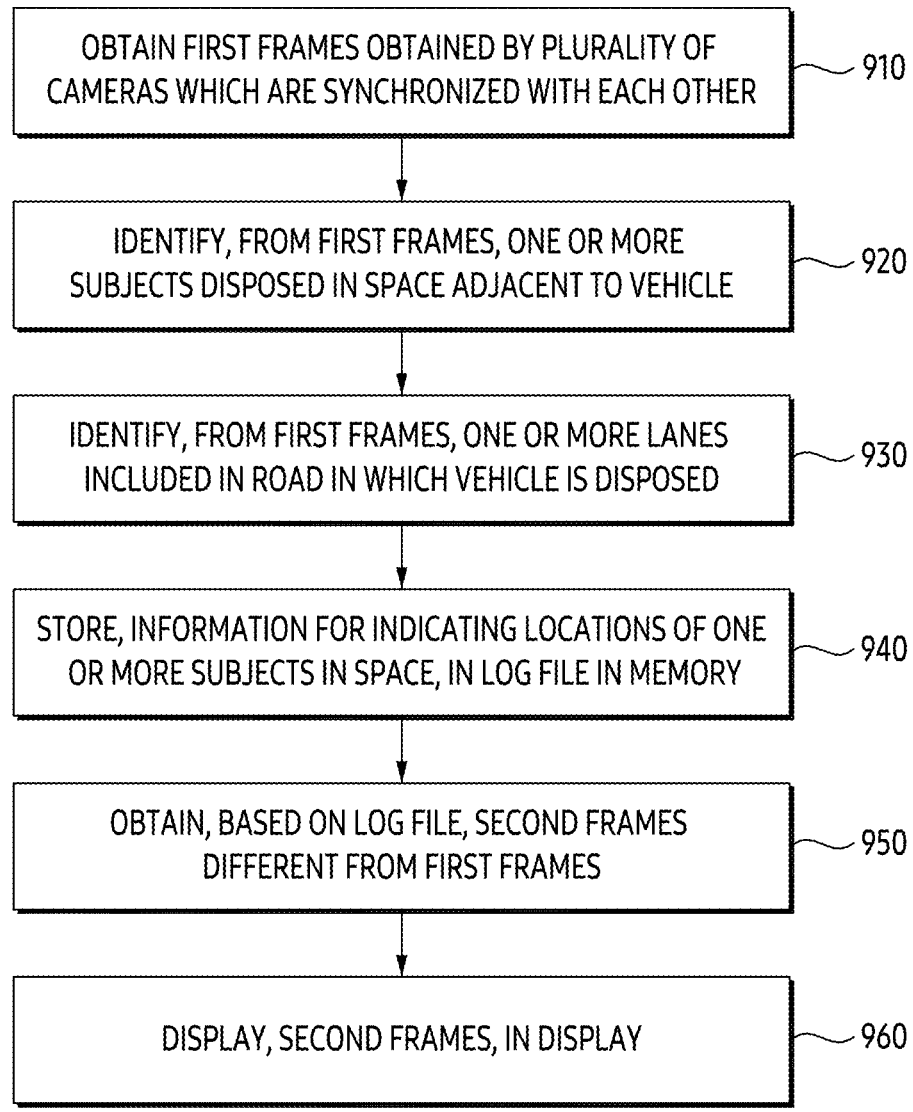
FIG. 9 is an exemplary flowchart illustrating an operation in which an electronic device identifies information on one or more subjects included in the plurality of frames based on a plurality of frames obtained by a plurality of cameras, according to an embodiment.

FIG. 9 is an exemplary flowchart illustrating an operation in which an electronic device identifies information on one or more subjects included in the plurality of frames based on a plurality of frames obtained by a plurality of cameras, according to an embodiment. At least one operation of the operations in FIG. 9 may be performed by the electronic device 101 in FIG. 1 and/or the processor 120 in FIG. 1. For example, the order of operations in FIG. 9 performed by the electronic device and/or the processor is not limited to those illustrated in FIG. 9. For example, the electronic device and/or the processor may perform a part of the operations in FIG. 9 in parallel, or by changing the order.

Referring to FIG. 9, in operation 910, the processor 120 according to an embodiment may obtain first frames obtained by the plurality of cameras synchronized with each other. For example, the plurality of cameras synchronized with each other may be referred to the plurality of cameras 150 in FIG. 1. For example, the first frames may comprise the frames 210, 220, 230, and 240 in FIG. 2B.

Referring to FIG. 9, in operation 920, the processor 120 according to an embodiment may identify the one or more subjects disposed in a space adjacent to the vehicle from the first frames. For example, the vehicle may be referred to the vehicle 205 in FIG. 2A. For example, the one or more subjects may comprise the vehicle 315 in FIG. 3, the vehicle 415 in FIG. 4A, the vehicle 515 in FIG. 5A, and/or the vehicle 615 in FIG. 6. For example, the processor 120 may identify the one or more subjects from the first frames by using a pre-trained neural network for identifying the subjects stored in memory. For example, the processor 120 may obtain information on the one or more subjects by using the neural network. The information may comprise types and/or sizes of the one or more subjects.

Referring to FIG. 9, in operation 930, the processor 120 according to an embodiment may identify one or more lanes included in the road on which the vehicle is disposed from the first frames. The lanes may comprise lanes 320, 323, and 325 in FIG. 3. The road may comprise the lane and, within the road, lines (e.g., the lines 321 and 322 in FIG. 3) for dividing the lane. For example, processor 120 may identify a lane included in the first frames by using a pre-trained neural network for identifying a lane stored in memory.

Referring to FIG. 9, in operation 940, the processor 120 according to an embodiment may store information for indicating locations of the one or more subjects in a space in a log file of a memory. For example, the processor 120 may obtain information for indicating the location by identifying the length and/or the width of the vehicle by using a bounding box. However, it is not limited thereto.

Referring to FIG. 9, in operation 950, the processor 120 according to an embodiment may obtain second frames different from the first frames based on the log file. For example, the second frames may be referred to the image 810 in FIG. 8A. For example, the second frames may comprise a plurality of visual objects corresponding to a road, a lane, and/or one or more subjects.

Referring to FIG. 9, in operation 960, the processor 120 according to an embodiment may display the second frames in the display. For example, data on the second frames may be stored in a log file, independently of displaying the second frames in the display. For example, the processor may display the second frames in the display in response to an input indicating the load of the data.

As described above, the electronic device and/or the processor may obtain a plurality of frames by using the plurality of cameras respectively disposed in the vehicle toward the front, side (e.g., left, or right), and rear. The electronic device and/or processor may identify information on the one or more subjects included in the plurality of frames and/or lanes (or lines). The electronic device and/or processor may obtain an image (e.g., top-view image) based on the information on the one or more subjects and the lanes. For example, the electronic device and/or processor may capture contact between the vehicle and a part of the one or more subjects, by using the plurality of cameras. For example, the electronic device and/or processor may indicate contact between the vehicle and a part of the one or more subjects by using visual objects included in the image. The electronic device and/or processor may provide accurate data on the contact by providing the image to the user.

Figure 10:
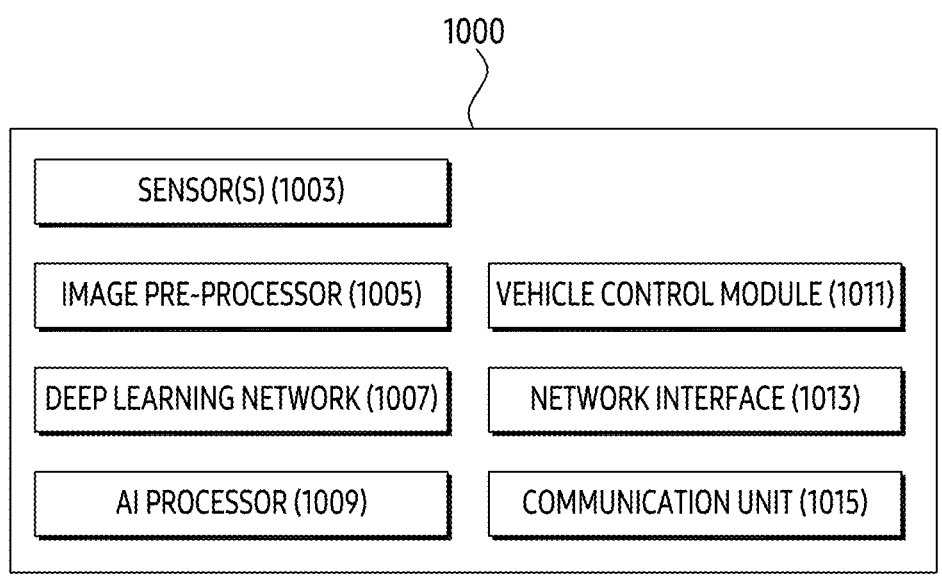
FIG. 10 is a block diagram illustrating an autonomous driving system of a vehicle.

FIG. 10 is a block diagram illustrating an autonomous driving system of a vehicle. The vehicle in FIG. 10 may be referred to the vehicle 205 in FIG. 2A. The electronic device 101 in FIG. 1 may comprise the autonomous driving system 1000.

The autonomous driving system 1000 of the vehicle according to FIG. 10 may be a deep learning network including sensors 1003, an image preprocessor 1005, a deep learning network 1007, an artificial intelligence (AI) processor 1009, a vehicle control module 1011, a network interface 1013, and a communication unit 1015. In various embodiments, each element may be connected through various interfaces. For example, sensor data sensed and output by the sensors 1003 may be fed to the image preprocessor 1005. The sensor data processed by the image preprocessor 1005 may be fed to the deep learning network 1007 running in the AI processor 1009.

The output of the deep learning network 1007 run by the AI processor 1009 may be fed to the vehicle control module 1011. Intermediate results of the deep learning network 1007 running on the AI processor 1009 may be fed to the AI processor 1009. In various embodiments, the network interface 1013 transmits autonomous driving path information and/or autonomous driving control commands for autonomous driving of the vehicle to internal block components by communicating with an electronic device in the vehicle. In an embodiment, the network interface 1031 may be used to transmit the sensor data obtained through the sensor(s) 1003 to an external server. In a part of embodiments, the autonomous driving control system 1000 may comprise additional or fewer components as appropriate. For example, in a part of embodiments, the image preprocessor 1005 may be an optional component. For another example, a post-processing component (not illustrated) may be included within the autonomous driving control system 1000 to perform post-processing on the output of the deep learning network 1007 before the output is provided to the vehicle control module 1011.

In a part of embodiments, the sensors 1003 may comprise one or more sensors. In various embodiments, the sensors 1003 may be attached to different locations on the vehicle. The sensors 1003 may face one or more different directions. For example, the sensors 1003 may be attached to the front, sides, rear, and/or roof of the vehicle to face directions such as forward-facing, rear-facing, side-facing, and the like. In a part of embodiments, the sensors 1003 may be image sensors such as high dynamic range cameras. In a part of embodiments, the sensors 1003 include non-visual sensors. In a part of embodiments, the sensors 1003 include a radar (RADAR), light detection and ranging (LiDAR), and/or ultrasonic sensors in addition to an image sensor. In a part of embodiments, the sensors 1003 are not mounted on a vehicle having the vehicle control module 1011. For example, the sensors 1003 may be included as part of a deep learning system for capturing the sensor data and may be attached to the environment or road and/or may be mounted on surrounding vehicles.

In a part of embodiments, the image pre-processor 1005 may be used to preprocess the sensor data of the sensors 1003. For example, the image pre-processor 1005 may be used to preprocess the sensor data, to split the sensor data into one or more components, and/or to postprocess the one or more components. In a part of embodiments, the image pre-processor 1005 may be a graphics processing unit (GPU), a central processing unit (CPU), an image signal processor, or a specialized image processor. In various embodiments, the image pre-processor 1005 may be a tone-mapper processor for processing high dynamic range data. In a part of embodiments, the image pre-processor 1005 may be a component of the AI processor 1009.

In a part of embodiments, the deep learning network 1007 may be a deep learning network for implementing control commands for controlling an autonomous vehicle. For example, the deep learning network 1007 may be an artificial neural network such as a convolutional neural network (CNN) trained by using the sensor data, and the output of the deep learning network 1007 is provided to the vehicle control module 1011.

In a part of embodiments, the artificial intelligence (AI) processor 1009 may be a hardware processor for running the deep learning network 1007. In a part of embodiments, the AI processor 1009 is a specialized AI processor for performing inference through a convolutional neural network (CNN) on the sensor data. In a part of embodiments, the AI processor 1009 may be optimized for bit depth of the sensor data. In a part of embodiments, the AI processor 1009 may be optimized for deep learning operations, such as operations of a neural network including convolution, dot product, vector and/or matrix operations. In a part of embodiments, the AI processor 1009 may be implemented through a plurality of graphics processing units (GPU) capable of effectively performing parallel processing.

In various embodiments, the AI processor 1009 may be coupled through an input/output interface to memory configured to perform deep learning analysis on the sensor data received from the sensor(s) 1003 while the AI processor 1009 is running and to provide the AI processor having commands that cause to determine machine learning results used to operate the vehicle at least partially autonomously. In a part of embodiments, the vehicle control module 1011 may be used to process commands for vehicle control output from the artificial intelligence (AI) processor 1009 and to transmit the output of the AI processor 1009 to commands for controlling the modules of each vehicle to control various modules of the vehicle. In a part of embodiments, the vehicle control module 1011 is used to control a vehicle for autonomous driving. In a part of embodiments, the vehicle control module 1011 may adjust the steering and/or speed of the vehicle. For example, the vehicle control module 1011 may be used to control driving of a vehicle such as deceleration, acceleration, steering, line change, line maintenance, and the like. In a part of embodiments, the vehicle control module 1011 may generate control signals for controlling vehicle lighting such as brake lights, turns signals, headlights, and the like. In a part of embodiments, the vehicle control module 1011 may be used to control vehicle audio-related systems such as vehicle's sound system, vehicle's audio warnings, vehicle's microphone system, vehicle's horn system, and the like.

In a part of embodiments, the vehicle control module 1011 may be used to control notification systems including warning systems to alert passengers and/or drivers of driving events such as approach to intended destination or potential collisions. In a part of embodiments, the vehicle control module 1011 may be used to adjust sensors such as the sensors 1003 of the vehicle. For example, the vehicle control module 1011 may modify the orientation of the sensors 1003, change the output resolution and/or format type of the sensors 1003, increase or decrease the capture rate, adjust the dynamic range, and adjust the focus of the camera. In addition, the vehicle control module 1011 may turn on/off the operations of the sensors individually or collectively.

In a part of embodiments, the vehicle control module 1011 may be used to change the parameters of the image pre-processor 1005 in such a way as modifying the frequency range of filters, adjusting edge detection parameters for features and/or object detection, or adjusting channels and bit depth, and the like. In various embodiments, the vehicle control module 1011 may be used to control autonomous driving of the vehicle and/or a driver assistance function of the vehicle.

In a part of embodiments, the network interface 1013 may be responsible for an internal interface between the block components of the autonomous driving control system 1000 and the communication unit 1015. Specifically, the network interface 1013 may be a communication interface for receiving and/or transmitting data including voice data. In various embodiments, the network interface 1013, through the communication unit 1015, may be connected to external servers to connect voice calls, receive and/or send text messages, transmit the sensor data, update the vehicle's software with the autonomous driving system, or update the vehicle's autonomous driving system software.

In various embodiments, the communication unit 1015 may comprise various wireless interfaces of a cellular or Wi-Fi method. For example, the network interface 1013 may be used to receive updates on operating parameters and/or commands for the sensors 1003, the image pre-processor 1005, the deep learning network 1007, the AI processor 1009, and the vehicle control module 1011 from the external server connected through the communication unit 1015. For example, the machine learning model of the deep learning network 1007 may be updated by using the communication unit 1015. According to another example, the communication unit 1015 may be used to update the operating parameters of the image pre-processor 1005 such as image processing parameters and/or firmware of the sensors 1003.

In another embodiment, the communication unit 1015 may be used to activate communication for emergency services and emergency contact in an accident or near-accident event. For example, in a collision event, the communication unit 1015 may be used to call emergency services for assistance, and may be used to notify collision details and emergency services about the location of the vehicle to the outside. In various embodiments, the communication unit 1015 may update or obtain the expected arrival time and/or destination location.

According to an embodiment, the autonomous driving system 1000 illustrated in FIG. 10 may be configured as an electronic device of a vehicle. According to an embodiment, when an autonomous driving release event occurs from a user during autonomous driving of a vehicle, the AI processor 1009 of the autonomous driving system 1000 may control the autonomous driving software of the vehicle to be learned by controlling the information related to the autonomous driving release event to be input as training set data of the deep learning network.

Figure 11:
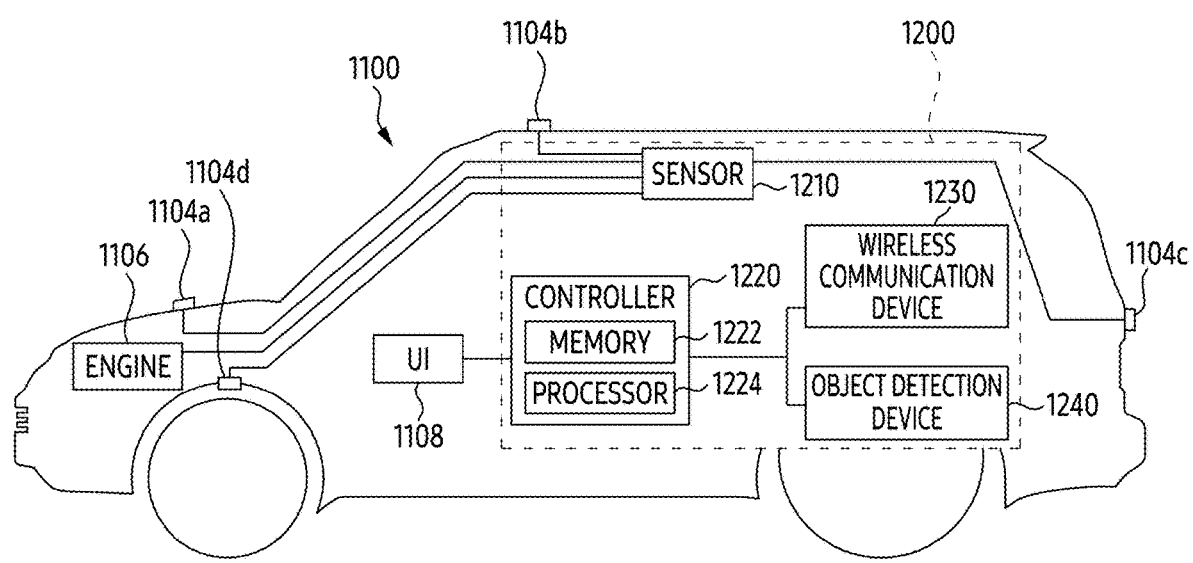
FIGS. 11 and 12 are block diagrams illustrating an autonomous vehicle according to an embodiment.
Figure 12:
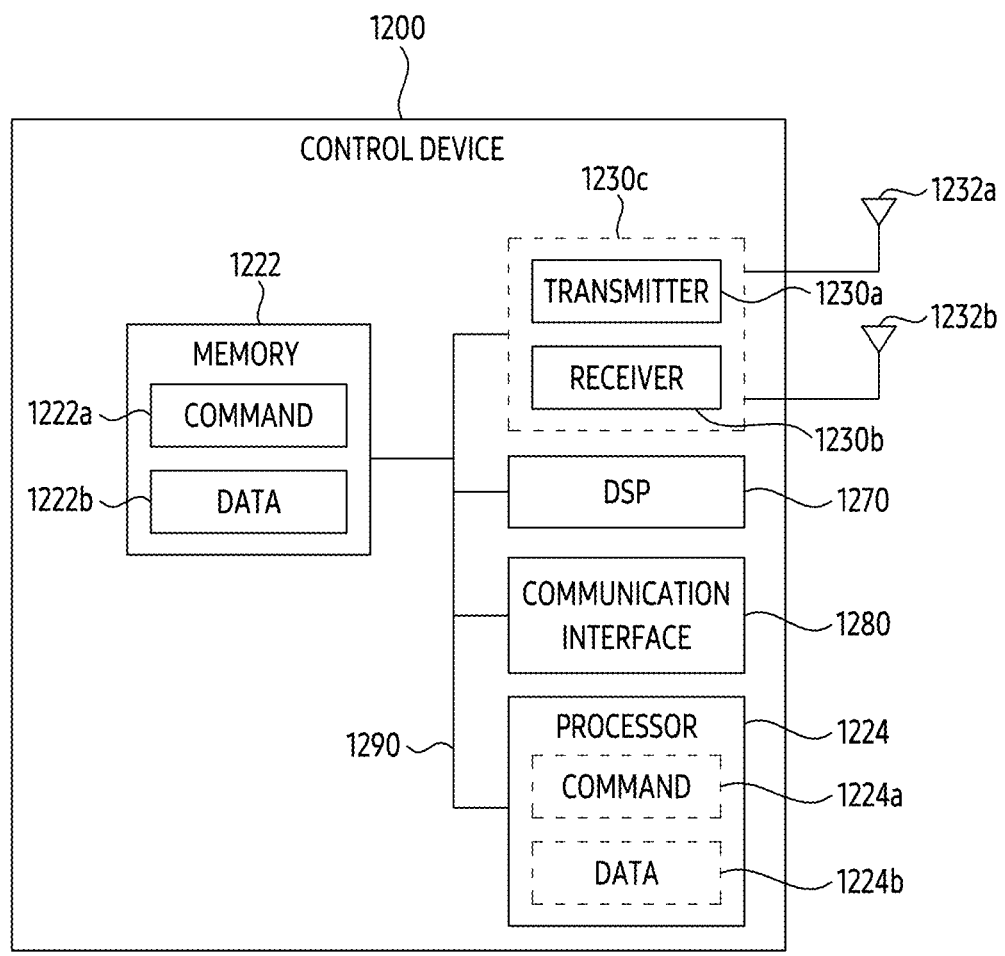

FIGS. 11 and 12 are block diagrams illustrating an autonomous vehicle according to an embodiment. Referring to FIG. 11, an autonomous vehicle 1100 according to the present embodiment may comprise a control device 1200, sensing modules 1104a, 1104b, 1104c, and 1104d, an engine 1106, and a user interface 1108. For example, the autonomous vehicle 1100 may be an example of the vehicle 205 in FIG. 2A. For example, the autonomous vehicle 1100 may be controlled by the electronic device 101.

The autonomous vehicle 1100 may equip an autonomous driving mode or a manual mode. For example, depending on the user input received through the user interface 1108, the manual mode may be switched to the autonomous driving mode, or the autonomous driving mode may be switched to the manual mode.

When the autonomous vehicle 1100 is operated in the autonomous driving mode, the autonomous vehicle 1100 may be operated under the control of the control device 1200.

In the present embodiment, the control device 1200 may comprise a controller 1220 including a memory 1222 and a processor 1224, a sensor 1210, a communication device 1230, and an object detection device 1240.

Here, the object detection device 1240 may perform all or part of the function of the distance measurement device (e.g., the electronic device 101).

In other words, in the present embodiment, the object detection device 1240 is a device for detecting an object located outside the autonomous vehicle 1100, and the object detection device 1240 may detect an object located outside the autonomous vehicle 1100 and may generate object information according to the detection result.

The object information may comprise information on the presence or absence of an object, location information of the object, distance information between the autonomous vehicle and the object, and relative speed information between the autonomous vehicle and the object.

The object may comprise various objects located outside the autonomous vehicle 1100, such as lines, another vehicle, a pedestrian, a traffic signal, light, a road, a structure, a speed bump, topography, an animal, and the like. Here, the traffic signal may be a concept including a traffic light, a traffic sign, a pattern, or text drawn on a road surface. In addition, the light may be light generated from a lamp provided in another vehicle, light generated from a streetlamp, or sunlight.

In addition, the structure may be an object located around the road and fixed to the ground. For example, the structure may comprise a streetlamp, a street tree, a building, a telephone pole, a traffic light, and a bridge. The topography may comprise a mountain, a hill, and the like.

This object detection device 1240 may comprise a camera module. The controller 1220 may extract object information from an external image photographed by the camera module and allow the controller 1220 to process the information on this.

In addition, the object detection device 1240 may further include imaging devices for recognizing an external environment. In addition to LIDAR, RADAR, GPS devices, odometry, and other computer vision devices, ultrasonic sensors, and infrared sensors may be used, and these devices may be selected or operated simultaneously as needed to enable more precise sensing.

Meanwhile, the distance measurement device according to an embodiment of the present invention may calculate the distance between the autonomous vehicle 1100 and the object, and may control the operation of the autonomous vehicle based on the distance calculated in connection with the control device 1200 of the autonomous vehicle 1100.

For example, in case that there is a possibility of collision depending on the distance between the autonomous vehicle 1100 and the object, the autonomous vehicle 1100 may control the brake to slow down or stop. As another example, in case that the object is a moving object, the autonomous vehicle 1100 may control the driving speed of the autonomous vehicle 1100 to maintain a predetermined distance or more from the object.

The distance measurement device according to an embodiment of the present invention may be configured as one module in the control device 1200 of the autonomous vehicle 1100. In other words, the memory 1222 and the processor 1224 of the control device 1200 may implement a collision prevention method according to the present invention in software.

In addition, the sensor 1210 may obtain various sensing information by connecting the sensing modules 1104a, 1104b, 1104c, and 1104d that sense the internal/external environment of the autonomous vehicle. Here, the sensor 1210 may comprise a posture sensor (e.g., a yaw sensor, a roll sensor, a pitch sensor), a collision sensor, a wheel sensor, a speed sensor, an inclination sensor, a weight detection sensor, a heading sensor, a gyro sensor, a position module, a autonomous vehicle forward/backward sensor, a battery sensor, a fuel sensor, a tire sensor, a steering sensor by handle rotation, a autonomous vehicle internal temperature sensor, a autonomous vehicle internal humidity sensor, an ultrasonic sensor, an illumination sensor, an accelerator pedal position sensor, a brake pedal position sensor, and the like.

Accordingly, the sensor 1210 may obtain sensing signals for autonomous vehicle posture information, autonomous vehicle collision information, autonomous vehicle direction information, autonomous vehicle position information (GPS information), autonomous vehicle angle information, autonomous vehicle speed information, autonomous vehicle acceleration information, autonomous vehicle inclination information, autonomous vehicle forward/backward information, battery information, fuel information, tire information, autonomous vehicle lamp information, autonomous vehicle internal temperature information, autonomous vehicle internal humidity information, steering wheel rotation angle, autonomous vehicle external illumination, pressure applied to the accelerator pedal, pressure applied to the brake pedal, and the like.

In addition, the sensor 1210 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

In this way, the sensor 1210 may generate autonomous vehicle state information based on the sensing data.

The wireless communication device 1230 is configured to implement wireless communication between the autonomous driving moving bodies 1100. For example, it allows the autonomous vehicle 1100 to communicate with the user's mobile phone or another wireless communication device 1230, another vehicle, a central device (traffic control devices), a server, and the like. The wireless communication device 1230 may transmit and receive a wireless signal according to an access wireless protocol. Wireless communication protocols may be Wi-Fi, Bluetooth, Long-Term Evolution (LTE), Code Division Multiple Access (CDMA), Wideband Code Division Multiple Access (WCDMA), and Global Systems for Mobile Communications (GSM), but the communication protocol is not limited thereto.

In addition, in the present embodiment, the autonomous vehicle 1100 may implement communication between moving bodies through the wireless communication device 1230. In other words, the wireless communication device 1230 may perform communication with one or more other vehicles on the road through vehicle-to-vehicle (V2V) communication. The autonomous vehicle 1100 may transmit and receive information such as driving warning and traffic information through communication between vehicles, and may request information or receive a request from another vehicle. For example, the wireless communication device 1230 may perform V2V communication with a dedicated short-range communication (DSRC) device or a cellular-V2V (C-V2V) device. In addition to communication between vehicles, communication (V2X, Vehicle to Everything communication) between vehicles and other objects (e.g., electronic devices carried by pedestrians, and the like) may also be implemented through the wireless communication device 1230.

In this embodiment, the controller 1220 is a unit that controls the overall operation of each unit in the autonomous vehicle 1100, and may be configured at the time of manufacture by the manufacturer of the autonomous vehicle or may be additionally configured to perform the function of autonomous driving after manufacture. Alternatively, a configuration for continuously performing an additional function through an upgrade of the controller 1220 configured at the time of manufacture may be included. Such a controller 1220 may also be named Electronic Control Unit (ECU).

The controller 1220 may collect various data from the connected sensor 1210, the object detection device 1240, the communication devices 1230, and the like and may transmit a control signal to the sensor 1210, the engine 1106, the user interface 1108, the communication device 1230, and the object detection device 1240 included in other components in the autonomous vehicle based on the collected data. In addition, although not illustrated, the control signal may also be transmitted to an acceleration device, a braking system, a steering device, or a navigation device related to driving of an autonomous vehicle.

In this embodiment, the controller 1220 may control the engine 1106, for example, may detect the speed limit of the road where the autonomous vehicle 1100 is driving and control the engine 1106 so that the driving speed does not exceed the speed limit, or may control the engine 1106 to accelerate the driving speed of the autonomous vehicle 1100 within a range that does not exceed the speed limit.

In addition, when the autonomous vehicle 1100 is close to or out of the line while the autonomous vehicle 1100 is driving, the controller 1220 may determine whether the line proximity and departure are due to a normal driving situation or other driving situations, and may control the engine 1106 to control the driving of the autonomous vehicle based on the determination result. Specifically, the autonomous vehicle 1100 may detect lines formed on both sides of a lane in which the autonomous vehicle is driving. In this case, the controller 1220 may determine whether the autonomous vehicle 1100 is close to or out of the line, and when it is determined that the autonomous vehicle 1100 is close to or out of the line, may determine whether such driving is according to an accurate driving situation or other driving situations. Here, as an example of a normal driving situation, it may be a situation in which a lane change of an autonomous vehicle is required. And, as an example of other driving situations, it may be a situation in which a lane change of the autonomous vehicle is not required. When it is determined that the autonomous vehicle 1100 is close to or out of the line in a situation that does not require a lane change of the autonomous vehicle, the controller 1220 may control the driving of the autonomous vehicle 1100 so that the autonomous vehicle 1100 normally drive in the corresponding autonomous vehicle without being out of the line.

In case that there is another autonomous vehicle or obstruction in front of the autonomous vehicle, the engine 1106 or the braking system may be controlled to decelerate the driving autonomous vehicle, and in addition to speed, trajectory, driving path, and steering angle may be controlled. Alternatively, the controller 1220 may control driving of the autonomous vehicle by generating necessary control signals according to recognition information of other external environments, such as driving lanes and driving signals of the autonomous vehicle.

In addition to generating its own control signal, the controller 1220 may control the driving of the autonomous vehicle by performing communication with the surrounding autonomous vehicle or the central server and transmitting a command to control the surrounding devices through the received information.

In addition, in case that the location or angle of view of the camera module 1250 is changed, since it may be difficult to accurately recognize a autonomous vehicle or a line according to the present embodiment, to prevent this, a control signal for controlling to perform the calibration of the camera module 1250 may be generated. Therefore, in the present embodiment, by generating a calibration control signal to the camera module 1250, the controller 1220 may continuously maintain the normal mounting location, direction, and angle of view of the camera module 1250 even if the mounting location of the camera module 1250 is changed by vibration or impact generated by the movement of the autonomous vehicle 1100. The controller 1220 may generate a control signal to calibrate the camera module 1220 when initial mounting location, direction, and angle of view information of the camera module 1220 stored in advance and initial mounting location, direction, angle of view information, and the like of the camera module 1220 measured during driving of the autonomous vehicle 1100 are different from each other by a threshold value or more.

In the present embodiment, the controller 1220 may comprise the memory 1222 and the processor 1224. The processor 1224 may execute software stored in the memory 1222 according to a control signal of the controller 1220. Specifically, the controller 1220 stores data and commands for performing the line detection method according to the present invention in memory 1222, and the commands may be executed by the processor 1224 to implement one or more methods disclosed herein.

In this case, the memory 1222 may be stored in a recording medium executable by the non-volatile processor 1224. The memory 1222 may store software and data through an appropriate internal external device. The memory 1222 may be configure with a random access memory (RAM), read only memory (ROM), a hard disk, and a memory 1222 device connected to a dongle.

The memory 1222 may store at least an operating system (OS), a user application, and executable commands. The memory 1222 may also store application data and array data structures.

The processor 1224 may be a microprocessor, an appropriate electronic processor, a controller, a microcontroller, or a state machine.

The processor 1224 may be implemented as a combination of computing devices, and computing devices may be a digital signal processor, a microprocessor, or an appropriate combination thereof.

Meanwhile, the autonomous vehicle 1100 may further include a user interface 1108 for user input to the above-described control device 1200. The user interface 1108 may allow the user to input information with an appropriate interaction. For example, it can be implemented as a touch screen, keypad, operation button, and the like. The user interface 1108 transmits an input or command to the controller 1220, and the controller 1220 may perform a control operation of the autonomous vehicle in response to the input or command.

In addition, the user interface 1108 may communicate with the autonomous vehicle 1100 through the wireless communication device 1230 as a device outside the autonomous vehicle 1100. For example, the user interface 1108 may be interlocked with a mobile phone, a tablet, or other computer device.

Furthermore, although it has been described that the autonomous vehicle 1100 includes the engine 1106 in the present embodiment, it is also possible to include another type of propulsion system. For example, a autonomous vehicle may be driven by electrical energy, hydrogen energy, or a hybrid system combining them. Accordingly, the controller 1220 may comprise a propulsion mechanism according to the propulsion system of the autonomous vehicle 1100, and may provide a control signal according to the propulsion system to the components of each propulsion mechanism.

Hereinafter, the detailed configuration of the control device 1200 according to the present invention according to the present embodiment will be described in more detail with reference to FIG. 12.

The control device 1200 includes the processor 1224. The processor 1224 may be a general-purpose single or multi-chip microprocessor, a dedicated microprocessor, a microcontroller, a programmable gate array, and the like. The processor may be referred to as a central processing unit (CPU). In addition, in the present embodiment, the processor 1224 may be used as a combination of a plurality of processors.

The control device 1200 also includes the memory 1222. The memory 1222 may be any electronic component capable of storing electronic information. The memory 1222 may also include a combination of the memories 1222 in addition to the single memory.

Data and the commands 1222a for performing the distance measurement method of the distance measurement device according to the present invention may be stored in the memory 1222. When the processor 1224 executes the commands 1222a, all or part of the commands 1222a and data 1222b required to execute the commands may be loaded onto the processor 1224 (1224a, 1224b).

The control device 1200 may comprise a transmitter 1230a, a receiver 1230b or a transceiver 1230c to allow transmission and reception of signals. One or more antennas 1232a and 1232b may be electrically connected to the transmitter 1230*a*, the receiver 1230*b*, or each transceiver 1230*c* and may additionally include antennas.

The control device 1200 may comprise a digital signal processor (DSP) 1270. Through the DSP 1270, digital signals may be quickly processed by autonomous vehicle.

The control device 1200 may also include a communication interface 1280. The communication interface 1280 may comprise one or more ports and/or communication modules for connecting other devices to the control device 1200. The communication interface 1280 may allow a user and the control device 1200 to interact with each other.

The various components of the control device 1200 may be connected together by one or more buses 1290, and the buses 1290 may comprise a power bus, a control signal bus, a state signal bus, a data bus, and the like. Under the control of the processor 1224, the components may transmit mutual information through the bus 1290 and perform a desired function.

Figure 13:
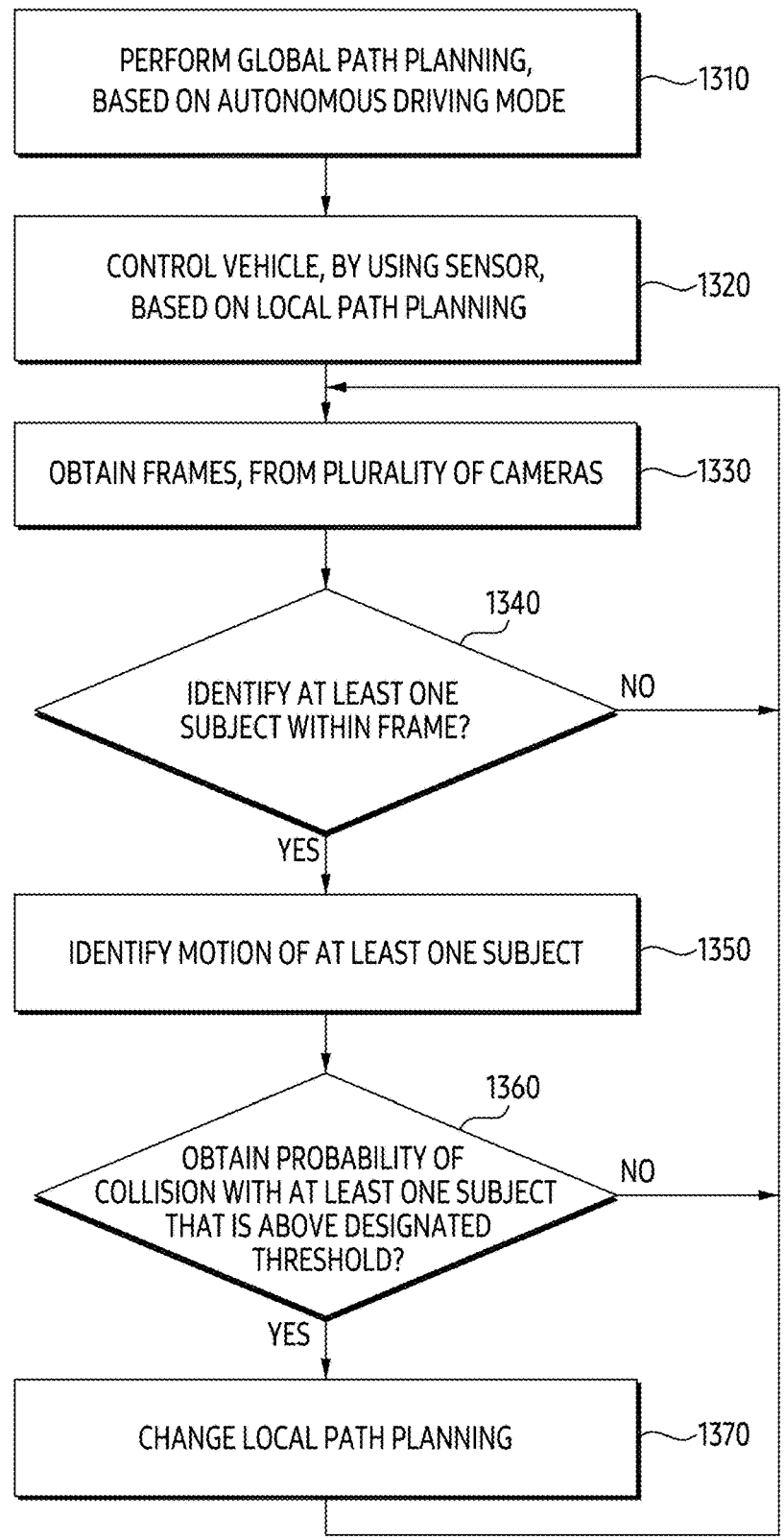
FIG. 13 is an exemplary flowchart illustrating an operation of controlling a vehicle by an electronic device according to an embodiment.

FIG. 13 is an exemplary flowchart illustrating an operation of controlling a vehicle by an electronic device according to an embodiment. The vehicle in FIG. 13 may be an example of the vehicle 205 in FIG. 2A and/or the autonomous vehicle 1100 in FIG. 11. At least one of the operations in FIG. 13 may be performed by the electronic device 101 in FIG. 1 and/or the processor 120 in FIG. 1.

Referring to FIG. 13, in operation 1310, an electronic device according to an embodiment may perform global path planning based on an autonomous driving mode. For example, the electronic device 101 may control the operation of a vehicle on which the electronic device mounted based on performing global path planning. For example, the electronic device 101 may identify a driving path of the vehicle by using data received from at least one server.

Referring to FIG. 13, in operation 1320, the electronic device according to an embodiment may control the vehicle based on local path planning by using a sensor. For example, the electronic device may obtain data on the surrounding environment of the vehicle by using a sensor within a state in which the vehicle is driven based on performing global path planning. The electronic device may change at least a part of the driving path of the vehicle based on the obtained data.

Referring to FIG. 13, according to an embodiment, in operation 1320, the electronic device may obtain a frame from a plurality of cameras. The plurality of cameras may be referred to the plurality of cameras 150 in FIG. 1. The frame may be included in one or more frames obtained from the plurality of cameras (e.g., the frames 210, 220, 230, and 240 in FIG. 2B).

Referring to FIG. 13, according to an embodiment, the electronic device may identify whether at least one subject has been identified in the frame. For example, the electronic device may identify the at least one subject by using a neural network. For example, at least one subject may be referred to the vehicle 315 in FIG. 3A, the vehicle 415 in FIG. 4A, the vehicle 515 in FIG. 5A, and/or the vehicle 615 in FIG. 6.

Referring to FIG. 13, in a state in which at least one subject is identified in the frame (operation 1330-yes), in operation 1340, the electronic device according to an embodiment may identify at least one subject's motion. For example, the electronic device may use the information of at least one subject obtained from the plurality of cameras to identify the motion of the at least one subject. The information may comprise location information, a type, size, and/or time of the at least one subject. The electronic device 101 may predict the motion of at least one subject based on the information.

Referring to FIG. 13, in operation 1350, according to an embodiment, the electronic device may identify whether a collision probability with at least one subject is obtained, and wherein the probability is greater than or equal to the specified threshold. The electronic device may obtain the collision probability by using another neural network different from the neural network for identifying at least one subject. The other neural network may be an example of the deep learning network 1007 in FIG. 10. However, it is not limited thereto.

Referring to FIG. 13, in operation 1360, the electronic device according to an embodiment may change local path planning when the collision probability with at least one subject is obtained (operation 1350-yes), which is equal to or greater than a designated threshold. For example, the electronic device may change the driving path of the vehicle based on the changed local path planning. For example, the electronic device may adjust the driving speed of the vehicle based on the changed local path planning. For example, the electronic device may control the vehicle to change the line based on the changed local path planning. However, it is not limited to the above-described embodiment.

As described above, based on the autonomous driving system 1000 in FIG. 10, the electronic device may identify at least one subject included in frames obtained through a camera within a state of controlling the vehicle. The motion of at least one subject may be identified based on the identified information on the at least one subject. Based on the identified motion, the electronic device may control the vehicle. By controlling the vehicle, the electronic device may prevent collision with the at least one subject. The electronic device may provide a user of the electronic device with safer autonomous driving by controlling the vehicle to prevent collisions with the at least one subject.

Figure 14:
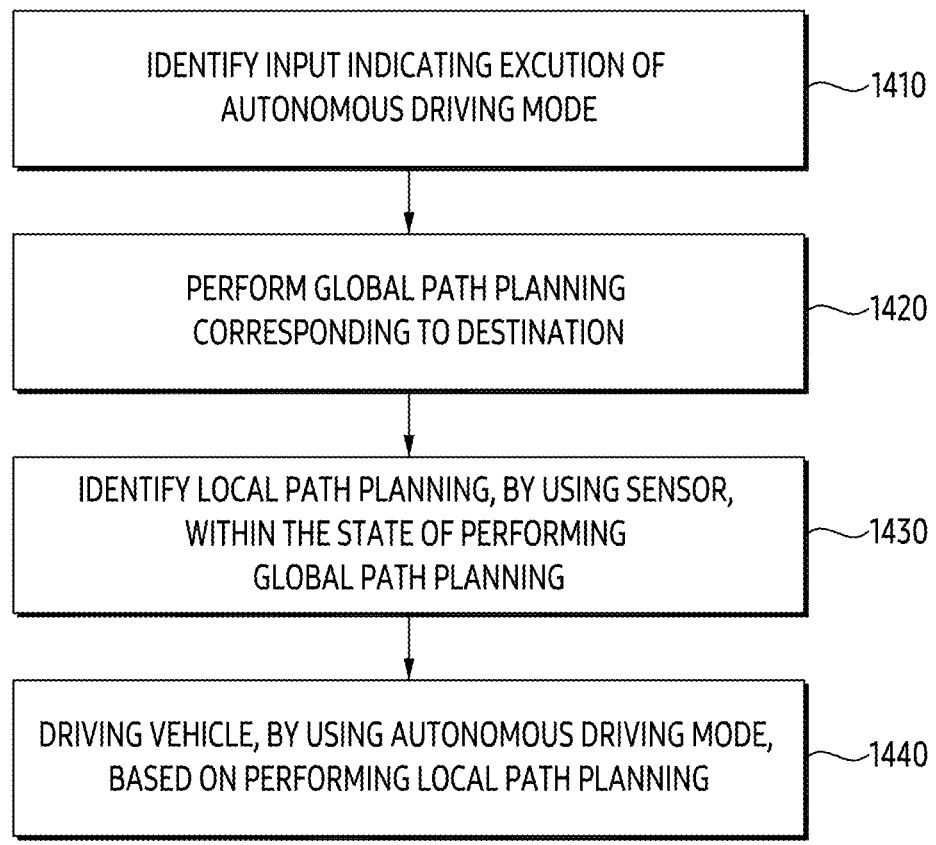
FIG. 14 is an exemplary flowchart illustrating an operation in which an electronic device controls a vehicle based on an autonomous driving mode according to an embodiment.

FIG. 14 is an exemplary flowchart illustrating an operation in which an electronic device controls a vehicle based on an autonomous driving mode according to an embodiment. At least one of the operations in FIG. 14 may be performed by the electronic device 101 in FIG. 1 and/or the processor 120 in FIG. 1. At least one of the operations in FIG. 14 may be related to operation 1310 in FIG. 13 and/or operation 1320 in FIG. 13.

Referring to FIG. 14, the electronic device according to an embodiment may identify an input indicating execution of the autonomous driving mode in operation 1410. The electronic device may control a vehicle on which the electronic device is mounted by using the autonomous driving system 1000 in FIG. 10, based on the autonomous driving mode. The vehicle may be driven by the electronic device based on the autonomous driving mode.

Referring to FIG. 14, in operation 1420, according to an embodiment, the electronic device may perform global path planning corresponding to a destination. The electronic device may receive an input indicating a destination from a user of the electronic device. For example, the electronic device may obtain location information of the electronic device from at least one server. Based on the location information, the electronic device may identify a driving path from a current location (e.g., departure place) of the electronic device to the destination. The electronic device may control the operation of the vehicle based on the identified driving path. For example, by performing global path planning, the electronic device may provide a user with a distance of a driving path and/or a driving time.

Referring to FIG. 14, in operation 1430, according to an embodiment, the electronic device may identify local path planning by using a sensor within a state in which global path planning is performed. For example, the electronic device may identify the surrounding environment of the electronic device and/or the vehicle on which the electronic device is mounted by using a sensor. For example, the electronic device may identify the surrounding environment by using a camera. The electronic device may change the local path planning based on the identified surroundings. The electronic device may adjust at least a part of the driving path by changing the local path planning. For example, the electronic device may control the vehicle to change the line based on the changed local path planning. For example, the electronic device may adjust the speed of the vehicle based on the changed local path planning.

Referring to FIG. 14, in operation 1440, the electronic device according to an embodiment may drive a vehicle by using an autonomous driving mode based on performing the local path planning. For example, the electronic device may change the local path planning according to a part of the vehicle's driving path by using a sensor and/or a camera. For example, the electronic device may change local path planning to prevent collisions with at least one subject within the state in which the motion of at least one subject is identified by using a sensor and/or camera. Based on controlling the vehicle by using the changed local path planning, the electronic device may prevent a collision with at least one subject.

Figure 15:
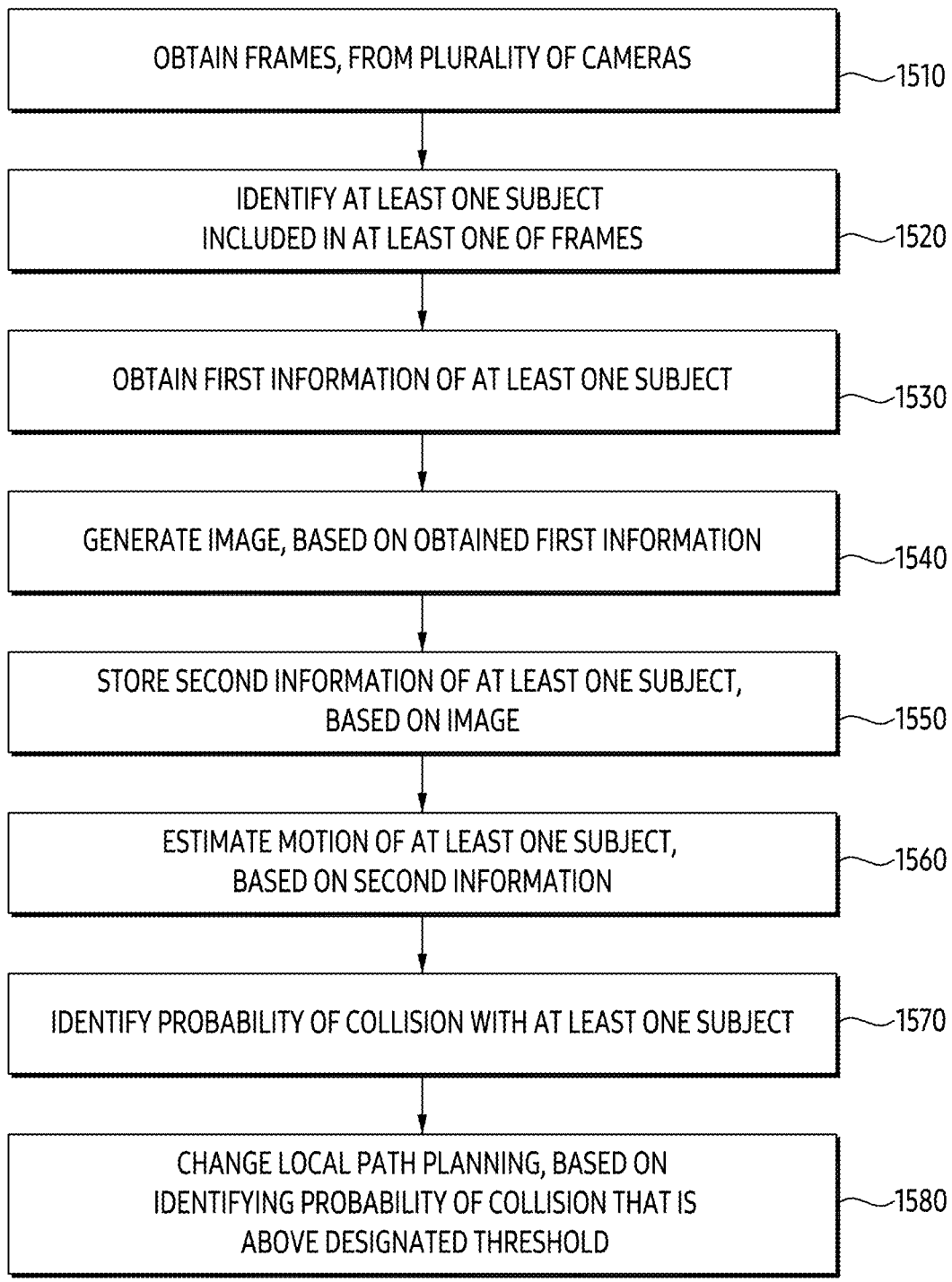
FIG. 15 is an exemplary flowchart illustrating an operation of controlling a vehicle by using information of at least one subject obtained by an electronic device by using a camera according to an embodiment.

FIG. 15 is an exemplary flowchart illustrating an operation of controlling a vehicle by using information of at least one subject obtained by an electronic device by using a camera according to an embodiment. At least one of the operations in FIG. 15 may be related to operation 1340 in FIG. 13. At least one of the operations in FIG. 15 may be performed by the electronic device in FIG. 1 and/or the processor 120 in FIG. 1.

The electronic device according to an embodiment may obtain frames from a plurality of cameras in operation 1510. For example, the electronic device may perform operation 1510, based on the autonomous driving mode, within a state in which the electronic device controls the vehicle mounted thereon. The plurality of cameras may be referred to the plurality of cameras 150 in FIG. 1. The frames may be referred to at least one of the frames 210, 220, 230, and 240 in FIG. 2B. The electronic device may distinguish the obtained frames from each of the plurality of cameras.

According to an embodiment, in operation 1520, the electronic device may identify at least one subject included in at least one of the frames. The at least one subject may comprise the vehicle 315 in FIG. 3A, the vehicle 415 in FIG. 4A, the vehicle 515 in FIG. 5A, and/or the vehicle 615 in FIG. 6. For example, the at least one subject may comprise a vehicle, a bike, a pedestrian, a natural object, a line, a road, and a lane. For example, the electronic device may identify the at least one subject through at least one neural network.

According to an embodiment the electronic device, in operation 1530, may obtain first information of at least one subject. For example, the electronic device may obtain information of the at least one subject based on data stored in the memory. For example, the at least one subject information may comprise a distance between the at least one subject and the electronic device, a type of the at least one subject, a size of the at least one subject, a location information of the at least one subject, and/or a time information when the at least one subject is captured.

In operation 1540, the electronic device according to an embodiment may obtain an image based on the obtained information. For example, the image may be referred to the image 810 in FIG. 8A. For example, the electronic device may display the image through a display. For example, the electronic device may store the image in a memory.

In operation 1550, the electronic device according to an embodiment may store second information of at least one subject based on the image. For example, the second information may comprise location information of at least one subject. For example, the electronic device may identify location information of at least one subject by using an image. For example, the location information may mean a coordinate value based on a 2-dimensional coordinate system and/or a 3-dimensional coordinate system. For example, the location information may comprise the points 813-1, 814-1, 815-1, and 816-1 in FIG. 8A. However, it is not limited thereto.

According to an embodiment, in operation 1560, the electronic device may estimate the motion of at least one subject based on the second information. For example, the electronic device may obtain location information from each of the obtained frames from the plurality of cameras. The electronic device may estimate the motion of at least one subject based on the obtained location information. For example, the electronic device may use the deep learning network 1007 in FIG. 10 to estimate the motion. For example, the at least one subject may move toward the driving direction of the vehicle in which the electronic device is disposed. For example, the at least one subject may be located on a lane different from the vehicle. For example, the at least one subject may cut in from the different lanes to the lane in which the vehicle is located. However, it is not limited thereto.

According to an embodiment, in operation 1570, the electronic device may identify a collision probability with at least one subject. For example, the electronic device may identify the collision probability based on estimating the motion of at least one subject. For example, the electronic device may identify the collision probability with the at least one subject based on the driving path of the vehicle on which the electronic device is mounted. In order to identify the collision probability, the electronic device may use a pre-trained neural network.

According to an embodiment, in operation 1580, the electronic device may change local path planning based on identifying a collision probability that is equal to or greater than a designated threshold. In operation 1310, the electronic device may change the local path planning within a state in which global path planning is performed based on the autonomous driving mode. For example, the electronic device may change a part of the driving path of the vehicle by changing the local path planning. For example, when estimating the motion of the at least one subject blocking the driving of the vehicle, the electronic device may reduce the speed of the vehicle. For example, the electronic device may identify at least one subject included in the obtained frames by using a rear camera (e.g., the fourth camera 154 in FIG. 1). For example, the at least one subject may be located on the same lane as the vehicle. The electronic device may estimate the motion of at least one subject approaching the vehicle. The electronic device may control the vehicle to change the line based on estimating the motion of the at least one subject. However, it is not limited to.

As described above, the electronic device may identify at least one subject within frames obtained from the plurality of cameras. The electronic device may identify or estimate the motion of the at least one subject based on the information of the at least one subject. The electronic device may control a vehicle on which the electronic device is mounted based on identifying and/or estimating the motion of the at least one subject. The electronic device may provide a safer autonomous driving mode to the user by controlling the vehicle based on estimating the motion of the at least one subject.

As described above, an electronic device mountable in a vehicle according to an embodiment may comprise a plurality of cameras disposed toward different directions of the vehicle, a memory, and a processor. The processor may obtain a plurality of frames obtained by the plurality of cameras which are synchronized with each other. The processor may identify, from the plurality of frames, one or more lines included in a road in which the vehicle is disposed. The processor may identify, from the plurality of frames, one or more subjects disposed in a space adjacent to the vehicle. The processor may obtain, based on the one or more lines, information for indicating locations in the space of the one or more subjects in the space. The processor may store the obtained information in the memory.

For example, the processor may store, in the memory, the information including a coordinate, corresponding to a corner of the one or more subjects in the space.

For example, the processor may store, in the memory, the information including the coordinate of a left corner of a first subject included in a first frame obtained from a first camera disposed in a front direction of the vehicle.

For example, the processor may store in the memory, the information including the coordinate of a right corner of a second subject included in a second frame obtained from a second camera disposed on a left side surface of the vehicle.

For example, the processor may store, in the memory, the information including the coordinate of a left corner of a third subject included in a third frame obtained from a third camera disposed on a right side surface of the vehicle.

For example, the processor may store, in the memory, the information including the coordinate of a right corner of a fourth subject included in a fourth frame obtained from a fourth camera disposed in a rear direction of the vehicle.

For example, the processor may identify, from the plurality of frames, movement of at least one subject of the one or more subjects. The processor may track the identified at least one subject, by using at least one camera of the plurality of cameras. The processor may identify the coordinate, corresponding to a corner of the tracked at least one subject and changed by the movement. The processor may store, in the memory, the information including the identified coordinate.

For example, the processor may store the information, in a log file matching to the plurality of frames.

For example, the processor may store types of the one or more subjects, in the information.

For example, the processor may store, the information for indicating time in which the one or more subjects is captured, in the information.

A method of an electronic device mountable in a vehicle according to an embodiment, may comprise an operation of obtaining a plurality of frames obtained by a plurality of cameras which are synchronized with each other. The method may identify, from the plurality of frames, one or more lines included in a road in which the vehicle is disposed. The method may comprise an operation of identifying, from the plurality of frames, the one or more subjects disposed in a space adjacent to the vehicle. The method may comprise an operation of obtaining, based on the one or more lines, information for indicating locations in the space of the one or more subjects in the space. The method may comprise an operation of storing the obtained information in the memory.

For example, the method may comprise storing, in the memory, the information including a coordinate, corresponding to a corner of the one or more subjects in the space.

For example, the method may comprise storing, in the memory, the information including the coordinate of a left corner of a first subject included in a first frame obtained from a first camera disposed in a front direction of the vehicle.

For example, the method may comprise storing, in the memory, the information including the coordinate of a right corner of a second subject included in a second frame obtained from a second camera disposed on a left side surface of the vehicle.

For example, the method may comprise storing, in the memory, the information including the coordinate of a left corner of a third subject included in a third frame obtained from a third camera disposed on a right side surface of the vehicle.

For example, the method may comprise storing, in the memory, the information including the coordinate of a right corner of a fourth subject included in a fourth frame obtained from a fourth camera disposed in a rear direction of the vehicle.

For example, the method may comprise identifying, from the plurality of frames, movement of at least one subject of the one or more subjects. The method may comprise tracking the identified at least one subject, by using at least one camera of the plurality of cameras. The method may comprise identifying the coordinate, corresponding to a corner of the tracked at least one subject and changed by the movement. The method may comprise storing, in the memory, the information including the identified coordinate.

For example, the method may comprise storing the information, in a log file matching to the plurality of frames.

For example, the method may comprise storing at least one of types of the one or more subjects or time in which the one or more subjects is captured, in the information.

A non-transitory computer readable storage medium storing one or more programs according to an embodiment, wherein the one or more programs, when being executed by a processor of an electronic device mountable in a vehicle, may obtain a plurality of frames obtained by a plurality of cameras which are synchronized with each other. For example, the one or more programs may identify, from the plurality of frames, one or more lines included in a road in which the vehicle is disposed. The one or more programs may identify, from the plurality of frames, the one or more subjects disposed in a space adjacent to the vehicle. The one or more programs may obtain, based on the one or more lines, information for indicating locations in the space of the one or more subjects in the space. The one or more programs may store the obtained information in the memory.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU(programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical pmedia such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device mountable in a vehicle, the electronic device comprising:
    a plurality of cameras disposed toward different directions of the vehicle;
    a memory; and
    a processor;
    wherein the processor is configured to:
    obtain a plurality of frames obtained from the plurality of cameras which are synchronized with each other;
    identify, from the plurality of frames, a type of a subject disposed in a space including the vehicle based on an exterior of the subject;
    identify a first width of the subject corresponding to the type;
    based on a difference between first pixel data in a bounding box with respect to the subject and second pixel data in the bounding box, identify a second width of the subject corresponding to at least a portion of a line segment on the bounding box;
    based on a ratio between the first width and the second width, obtain location information indicating a relative distance between the vehicle and the subject; and
    by using the location information, generate an image including a first visual object corresponding to the vehicle positioned in a reference location of the image, and a second visual object corresponding to the subject positioned with respect to the reference location in accordance with the relative distance.

2. The electronic device of claim 1, wherein the processor is configured to:
    by using a sliding window shifted in the bounding box, identify the difference between the first pixel data identified in the sliding window and the second pixel data identified in the sliding window,
    based on determination that the difference is within a reference range, identify symmetry of the subject with respect to a central axis of the subject, and
    by using the symmetry of the subject, identify the second width.

3. The electronic device of claim 2, wherein
    a first position on one of the plurality of frames corresponding to the first pixel data is symmetric with respect to a second position on the one corresponding to the second pixel data with respect to the central axis.

4. The electronic device of claim 1, wherein the processor is configured to:
    store, in the memory, the location information including a point of the image corresponding to a coordinate corresponding to a corner of the subject in the space.

5. The electronic device of claim 1, wherein the processor is configured to:
    by using the bounding box, identify a length of the subject, and
    obtain the location information indicating the relative distance based on the ratio and the length.

6. The electronic device of claim 1, wherein the processor is configured to:
    identify, from the plurality of frames, one or more lines included in a road in which the vehicle is disposed, and
    wherein the image is obtained by projecting the plurality of frames to a plane including a moving direction of the vehicle corresponding to the first visual object, and further includes a third visual object corresponding to the one or more lines.

7. The electronic device of claim 1, wherein the processor is configured to:
    identify, from the plurality of frames, movement a subject,
    track the identified subject, by using at least one camera of the plurality of cameras,
    identify a coordinate, corresponding to a corner of the tracked subject and changed by the movement, and
    store, in the memory, the location information including the identified coordinate.

8. The electronic device of claim 1, wherein the processor is configured to:
store the location information, in a log file matching to the plurality of frames.

9. The electronic device of claim 8, wherein the processor is configured to:
store the location information for indicating the type of the subject, in the log file.

10. The electronic device of claim 8, wherein the processor is configured to:
store the location information for indicating time in which the subject is captured.

11. A method of an electronic device mountable in a vehicle, comprises:
obtaining a plurality of frames obtained from a plurality of cameras which are synchronized with each other;
identifying, from the plurality of frames, a type of a subject disposed in a space including the vehicle based on an exterior of the subject;
identifying a first width of the subject corresponding to the type;
based on a difference between first pixel data in a bounding box with respect to the subject and second pixel data in the bounding box, identifying a second width of the subject corresponding to at least a portion of a line segment on the bounding box;
based on a ratio between the first width and the second width, obtaining location information indicating a relative distance between the vehicle and the subject; and
by using the location information, generating an image including a first visual object corresponding to the vehicle positioned in a reference location of the image, and a second visual object corresponding to the subject positioned with respect to the reference location in accordance with the relative distance.

12. The method of claim 11, wherein the method further comprises:
by using a sliding window shifted in the bounding box, identifying the difference between the first pixel data identified in the sliding window and the second pixel data identified in the sliding window,
based on determination that the difference is within a reference range, identifying symmetry of the subject with respect to a central axis of the subject, and
by using the symmetry of the subject, identifying the second width.

13. The method of claim 12, wherein
a first position on one of the plurality of frames corresponding to the first pixel data is symmetric with respect to a second position on the one corresponding to the second pixel data with respect to the central axis.

14. The method of claim 11, wherein the method further comprises:
storing, in the memory, the location information including a point of the image corresponding to a coordinate corresponding to a corner of the subject in the space.

15. The method of claim 11, wherein the method further comprises:
by using the bounding box, identifying a length of the subject, and
obtaining the location information indicating the relative distance based on the ratio and the length.

16. The method of claim 11, wherein the method further comprises:
identifying, from the plurality of frames, one or more lines included in a road in which the vehicle is disposed, and
wherein the image is obtained by projecting the plurality of frames to a plane including a moving direction of the vehicle corresponding to the first visual object, and further includes a third visual object corresponding to the one or more lines.

17. The method of claim 11, wherein the method further comprises:
identifying, from the plurality of frames, movement of a subject,
tracking the identified subject, by using at least one camera of the plurality of cameras,
identifying a coordinate, corresponding to a corner of the tracked subject and changed by the movement, and
storing, in the memory, the location information including the identified coordinate.

18. The method of claim 11, wherein the method further comprises:
storing the location information, in a log file matching to the plurality of frames.

19. The method of claim 18, wherein the method further comprises:
storing the location information for indicating the type of the subject or the location information for indicating time in which the subject is captured, in the log file.

20. A non-transitory computer readable storage medium storing one or more programs, wherein the one or more programs, when being executed by a processor of an electronic device mountable in a vehicle, are configured to:
obtain a plurality of frames obtained from a plurality of cameras which are synchronized with each other;
identify, from the plurality of frames, a type of a subject disposed in a space including the vehicle based on an exterior of the subject;
identify a first width of the subject corresponding to the type;
based on a difference between first pixel data in a bounding box with respect to the subject and second pixel data in the bounding box, identify a second width of the subject corresponding to at least a portion of a line segment on the bounding box;
based on a ratio between the first width and the second width, obtain location information indicating a relative distance between the vehicle and the subject; and
by using the location information, generate an image including a first visual object corresponding to the vehicle positioned in a reference location of the image, and a second visual object corresponding to the subject positioned with respect to the reference location in accordance with the relative distance.

* * * * *